United States Patent [19]
Nakamura

[11] Patent Number: 6,041,074
[45] Date of Patent: *Mar. 21, 2000

[54] SPREAD SPECTRUM PULSE POSITION MODULATION SYSTEM

[75] Inventor: Masaru Nakamura, Edahigashi, Japan

[73] Assignee: Ricoh Company, Ltd., Tokyo, Japan

[ * ] Notice: This patent is subject to a terminal disclaimer.

[21] Appl. No.: 09/229,896

[22] Filed: Jan. 14, 1999

Related U.S. Application Data

[63] Continuation of application No. 08/878,903, Jun. 19, 1997, Pat. No. 5,884,134, which is a continuation of application No. 08/862,647, May 23, 1997.

[30] Foreign Application Priority Data

May 24, 1996 [JP] Japan ................................. 8-151917

[51] Int. Cl.[7] ..................................................... H04B 1/69
[52] U.S. Cl. .......................... 375/200; 375/207; 375/208; 375/239; 375/343; 370/213; 332/112
[58] Field of Search ..................................... 375/200, 207, 375/208, 343, 239; 370/213; 332/112

[56] References Cited

U.S. PATENT DOCUMENTS

| | | | |
|---|---|---|---|
| 5,596,601 | 1/1997 | Bar-David | 375/207 |
| 5,654,978 | 8/1997 | Vanderpool et al. | 375/200 |

*Primary Examiner*—Temesghen Ghebretinsae
*Attorney, Agent, or Firm*—Oblon, Spivak, McClelland, Maier & Neustadt, P.C.

[57] ABSTRACT

A spread spectrum pulse position modulation/demodulation system which receives an input signal including frames and which includes first and second pulse position modulators. The first pulse position modulator modulates each frame by inserting a first pseudo noise code into a selected slot of each frame according to the input signal to generate a first spread spectrum pulse position modulating signal. The second pulse position modulator modulates each frame by inserting a second pseudo noise code into a selected slot of each frame according to the input signal to generate a second spread spectrum pulse position modulating signal. An adder adds together the first and second spread spectrum pulse position modulating signals to generate a third spread spectrum pulse position modulating signal. This third spread spectrum pulse position modulating signal may be transmitted by a radio transmitter, and then received by a radio receiver. The received third spread spectrum pulse position modulating signal can then be input into a demodulator for demodulating this third spread spectrum pulse position modulating signal. The demodulator includes at least one matched filter to output a first pulse signal corresponding to the first spread spectrum pulse position modulating signal and to output a second pulse signal corresponding to the second spread spectrum pulse position modulating signal.

69 Claims, 16 Drawing Sheets

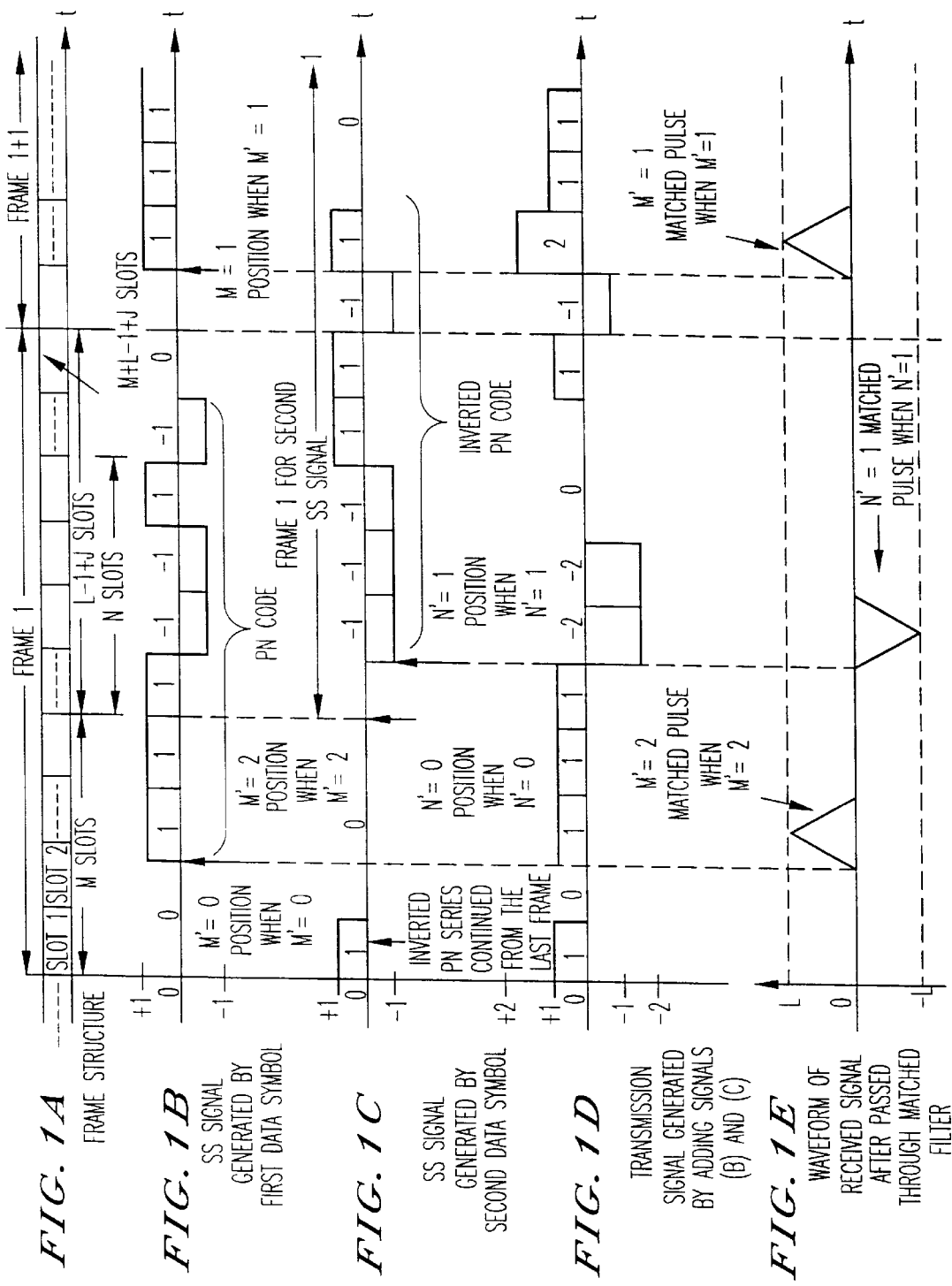

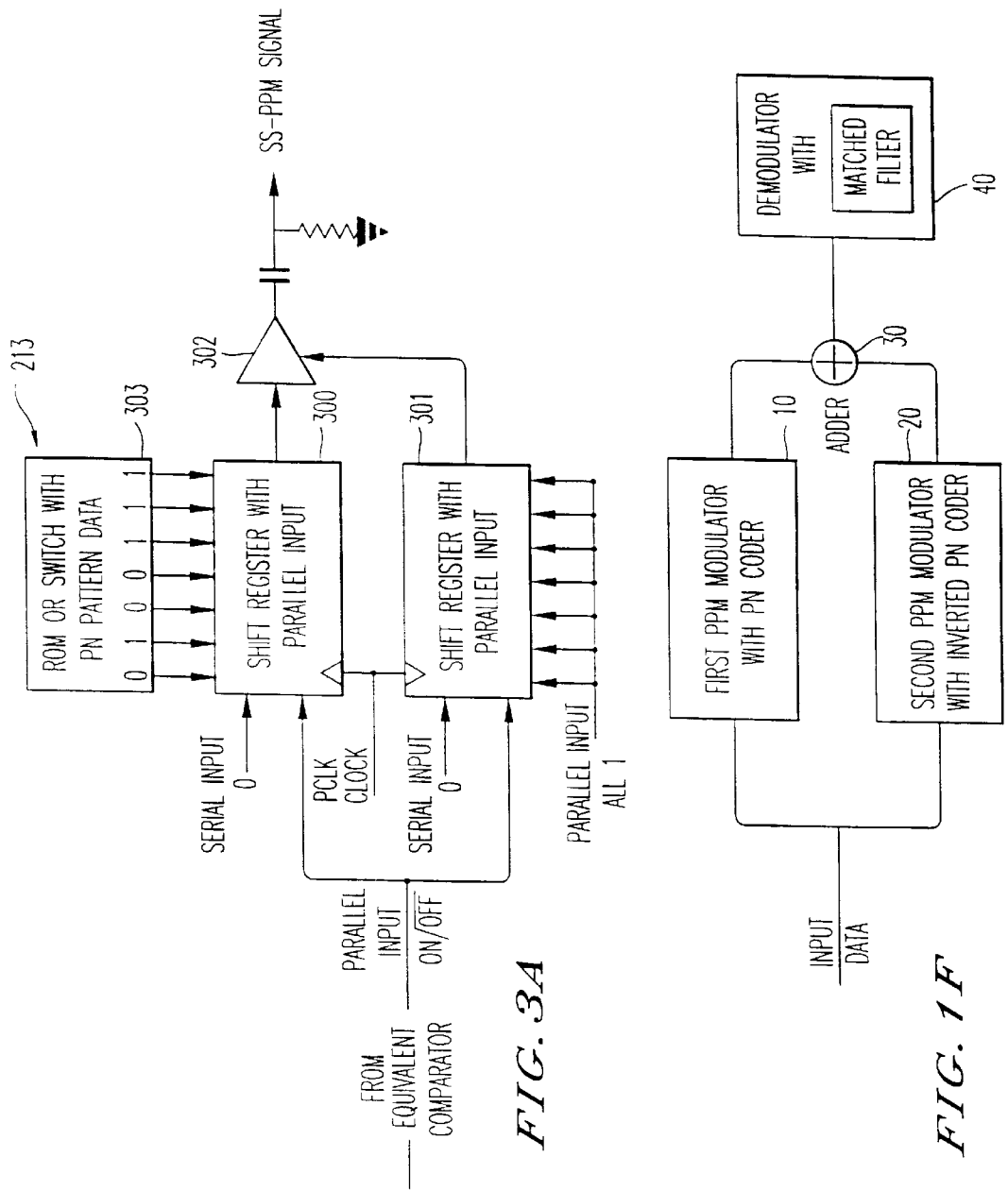

FIG. 13A FRAME STRUCTURE

FIG. 13B SS SIGNAL GENERATED BY FIRST DATA SYMBOL

SPREAD SPECTRUM PULSE POSITION MODULATION SYSTEM

This APPLN is a con of Ser. No. 08/878,903 filed Jun. 19, 1997 now U.S. Pat. No. 5,884,134, which is a con of APPLN Ser. No. 08/862,647 May 23, 1997.

BACKGROUND OF THE INVENTION

1. Field of the Invention

This invention relates to a communication system employing a spread spectrum pulse position modulation, and a transmitter and receiver for the communication employing the spread spectrum pulse position modulation, such as for indoor radio communication, radio LAN, and high-speed data communication.

2. Discussion of the Background

Japanese Patent Laid-Open Application No. 4-113732 discloses a spread spectrum pulse position modulation communication system. According to this spread spectrum pulse position modulation communication system, a one-cycle pseudo noise code is generated at each of regular intervals so that multi-valued information is sent at a start position of the one-cycle pseudo noise code, instead of sending information in accordance with a pseudo noise code swing, and this enables high-speed transmission.

Japanese Patent Laid-Open Application No. 4-137835 discloses a further spread spectrum pulse position modulation communication system, which improves upon the spread spectrum pulse position modulation communication system disclosed in Japanese Patent Laid-Open Application No. 4-113732. In this further spread spectrum pulse position modulation communication system, transmission data is subject to differential coding, so that a synchronizing pulse is eliminated, which thereby achieves further high-speed transmission.

In order words, the Japanese Patent Laid-Open Application No. 4-137835 discloses a spread spectrum pulse position modulation communication system which is capable of high-speed data communication within a limited band by using a one-cycle pseudo noise code for data transmission instead of a pulse of a pulse position modulating signal, and in which a start position of the pseudo noise code for modulation is made multi-valued, so that the communication can be speeded up more than any background direct-spread system for multiplying a primary modulation wave by a periodic pseudo noise code.

The spread spectrum pulse position modulation communication system disclosed in the Japanese Patent Laid-Open Application No. 4-137835 will now be described specifically with reference to FIGS. 13 to 15. As shown in FIG. 13(a), in this background spread spectrum pulse position modulation communication system, a pseudo noise (PN) code whose length is L is used for spread spectrum and the number of slots to be used for pulse position modulation is M, and one frame has M+L−1+j slots. Then one slot is selected from the M slots numbered from the start of the frame in correspondence to desired transmission data that has been subject to differential coding, and the pseudo noise code is inserted into L slots starting from the selected slot for spreading the transmission data. FIG. 13(b) shows a spread spectrum transmission signal in one frame of desired transmission data M' after being differential-coded at a second (2) slot position, where M=4, L=7, j=0. In this example, the pattern of the pseudo noise code is denoted as "1, 1, 1, −1, −1, 1, −1".

Referring next to FIGS. 14 and 15, circuit structures of transmission and reception units for data communication with such a frame structure of FIG. 13 will be described. As shown in FIG. 14, in a transmission unit a clock signal generator 1400 outputs clock signals to drive a pseudo noise signal generator 1401 and a counter 1402 whose value is reset to 0 after M+L−1+j counts. A serial/parallel converter 1403 converts serial data to be transmitted into parallel data having an M value and a register 1404 stores a last frame of the parallel data. An adder 1405 adds the current output data from serial/parallel converter 1403 and the last frame of parallel data stored in register 1404, and the added value of this data is fed back to the register 1404 and is differential-coded. Then, a comparator 1406 compares the output value of the register 1404 with the value of the counter 1402, and when both values match each other, comparator 1406 sends a trigger pulse signal to the pseudo noise signal generator 1401 to cause generation of a one-cycle pseudo noise code. It should be noted that the register 1404 is synchronized with a frame clock generated by a detector 1407 detecting when outputs of the counter 1402 reach a given value.

The clock generated by detector 1407 is multiplied by a phase lock loop PLL 1408 and the multiplied clock is used as a clock for converting serial data into parallel data in serial/parallel converter 1403. A multiplier 1410 multiplies a signal from the pseudo noise signal generator 1401 by a signal from an oscillator 1409 to convert the multiplied signal into a high-frequency signal to be transmitted as a radio signal from an antenna 1412 through a band pass filter 1411 and the like.

In a reception unit shown in FIG. 15, an antenna 1500 receives a signal from the transmission unit of FIG. 14. An amplifier 1501 amplifies the received signal and a multiplier 1503 multiplies the received signal by a local oscillation signal from an oscillator 1502 to convert the multiplied signal into an intermediate-frequency signal. The intermediate-frequency signal is amplified through a band pass filter 1504 and a gain control amplifier 1505, and is then inversely spread through a matched filter 1506 corresponding to the same pseudo noise code as used in the transmission unit of FIG. 14 so that a pulse position modulating signal is regenerated. The pulse position modulating signal is then detected by a detector 1507 and is converted into a base-band pulse position modulating signal. Then, a pulse interval measurement circuit 1508 following the detector 1508 measures a pulse interval of this signal and regenerates transmitted data from the measured value. Finally, a parallel/serial converter 1509 converts the transmitted data into serial data for regeneration of a signal identical to the input data signal of the transmitter of FIG. 14.

With such a background communication system, it is very difficult to achieve a high-speed transmission, and thus such a background system has not found use in a LAN, high-speed communication system, etc. In order to achieve a high-speed communication with such a background spread spectrum pulse position modulation communication system, a code division multiplexing is needed for spread spectrum communication. It is therefore necessary to employ a plurality of pseudo noise codes. These pseudo noise codes need to be spread through respective pseudo noise generators. This requires not only a transmitter to provide a plurality of pseudo noise generators, but also a receiver to provide a number of demodulation sections in correspondence to the number of pseudo noise generators, and this causes a problem in that the circuit structure is complicated.

SUMMARY OF THE INVENTION

Accordingly, the present invention has been made in consideration of the above problems in the background art, and an object of the present invention is to provide a novel spread spectrum communication system using only one pseudo noise code and its inverted pseudo noise code for high-speed transmission, which is equivalent to a background system which utilizes two pseudo noise code but the present invention does not require doubling a required number of demodulator sections.

That is, the background art suffers from a drawback in that the background art systems are very difficult to implement in a network where very high speed communication is required. The present invention allows a speeding up of communication, which can thereby allows use in a network, such as a LAN, or in other high speed applications.

The present invention achieves such objectives as noted above by utilizing a spread spectrum pulse position modulation/demodulation system which receives an input signal including frames and which includes first and second spread spectrum pulse position modulators. The first pulse position modulator modulates the input signal by inserting a first pseudo noise code into a selected slot of each frame to generate a first spread spectrum pulse position modulating signal. The second pulse position modulator modulates the input signal by inserting a second pseudo noise code into a selected slot of each frame to generate a second spread spectrum pulse position modulating signal. An adder adds together the first and second spread spectrum pulse position modulating signals to generate a third spread spectrum pulse position modulating signal.

This third spread spectrum pulse position modulating signal may be transmitted by a radio transmitter, and then received by a radio receiver. The received third spread spectrum pulse position modulating signal can then be input into a demodulator for demodulating this third spread spectrum pulse position modulating signal. The demodulator includes at least one matched filter to output a first pulse signal corresponding to the first spread spectrum pulse position modulating signal and to output a second pulse signal corresponding to the second spread spectrum pulse position modulating signal.

BRIEF DESCRIPTION OF THE DRAWINGS

A more complete appreciation of the present invention, and many of the attendant advantages thereof will be readily obtained as the same becomes better understood by reference to the following detailed description when considered in connection with the accompanying drawings, wherein:

FIGS. 1(a)–1(e) are diagrams explaining a communication method employing a spread spectrum pulse position modulation according to an embodiment of the present invention;

FIG. 1(f) is a block diagram showing an outline of a spread spectrum pulse position modulation/demodulation system according to an embodiment of the present invention;

FIGS. 3(a) and 3(b) are block diagrams showing exemplary pseudo noise code generators used in the spread spectrum pulse position modulation transmitter according to embodiments of the present invention;

DESCRIPTION OF THE PREFERRED EMBODIMENTS

Figure 2:
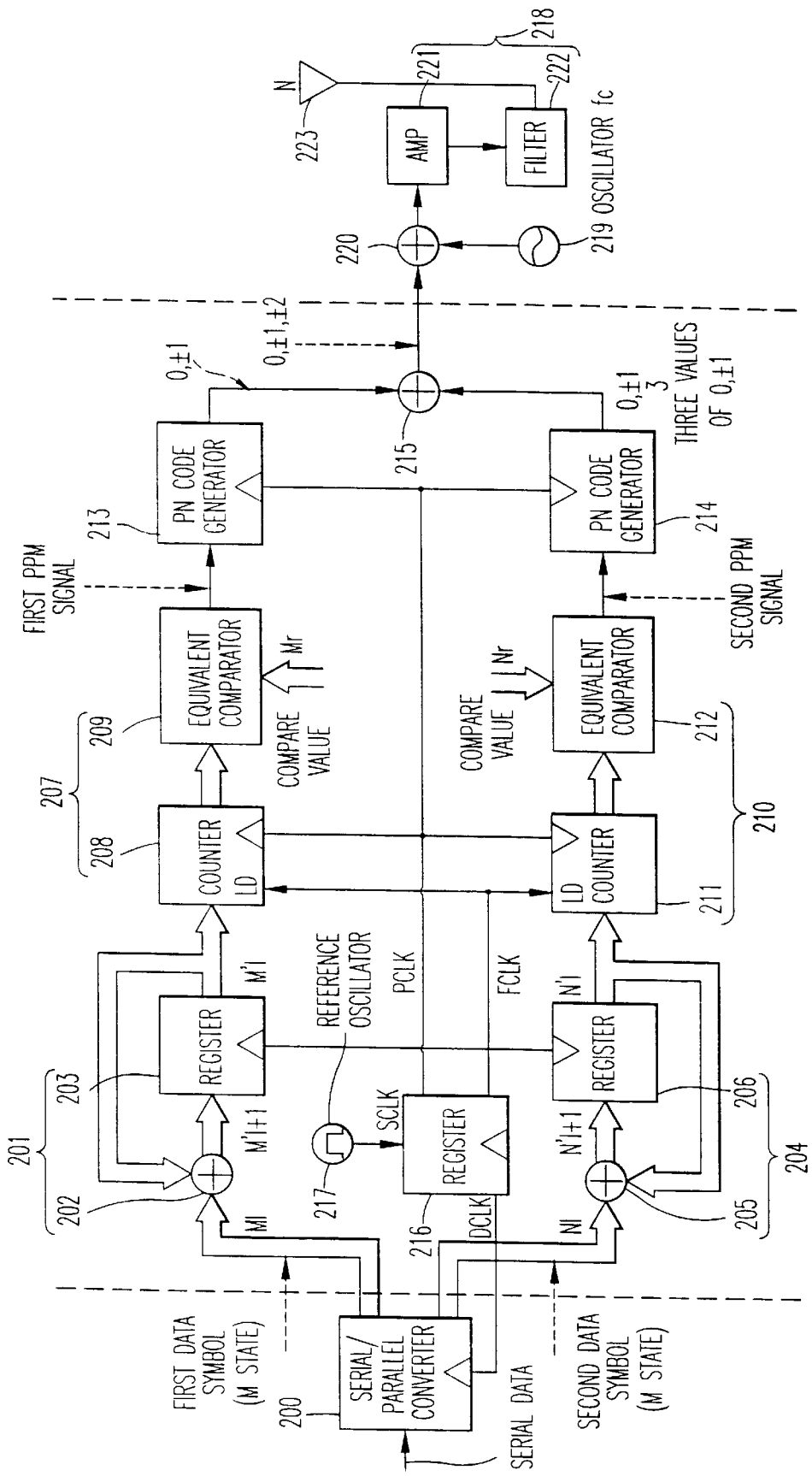
FIG. 2 is a block diagram showing a structure of a spread spectrum pulse position modulation transmitter according to an embodiment of the present invention.

Referring now to the drawings, wherein like reference numerals designate identical or corresponding parts, description will be made in detail below with respect to embodiments of a communication system employing a spread spectrum pulse position modulation, and a transmitter and receiver for the communication system employing the spread spectrum pulse position modulation, according to the present invention.

An embodiment of the present invention is directed to a communication operation employing a spread spectrum pulse position modulation. According to an embodiment of the present invention, a communication operation employs a spread pulse position modulation, in which data signals to be transmitted are subject to a spread spectrum pulse position modulation and consecutive frames are sent continuously, one frame including M+L−1+j slots. This operation of the present invention prepares a first pseudo noise code whose period is L having a chip rate equal to a slot rate of one frame, and a second inverted pseudo noise code, i.e., which is an inversion of the first pseudo noise code.

The above-mentioned communication operation employing spread spectrum pulse position modulation will now be described below with reference to FIG. 1.

In a communication operation employing spread spectrum pulse position modulation of the present invention, a first data symbol having an M value and a second data symbol having an N value (M=N) are used as transmission data. Then, a first pseudo noise code having a period L and a second pseudo noise code, which is an inverted signal of the first pseudo noise code, are prepared. In this embodiment, each frame includes M+L−1+j slots, as shown in FIG. 1(a), and one slot is selected from M slots numbered from the start of the frame in correspondence to a first data symbol value that has been subject to differential coding. Then, the pseudo noise code is inserted into L slots starting from the selected slot for generation of a first spread spectrum pulse position modulating signal.

FIG. 1(b) shows a case in which M=4, L=7, and j=0. In FIG. 1(b), the pattern of the pseudo noise code is denoted as "1, 1, 1, −1, −1, 1, −1", and one frame is shown in which the pseudo noise code is inserted into a desired transmission data M' after being differential-coded at a slot 2 (i.e., after the second slot). Similarly, a consecutive N slots are selected from the L−1+j slots that results from subtracting the M slots from all the slots in the one frame, and one slot is selected from the N slots in correspondence to a second data symbol value that has been differential-coded.

That is, in this operation of the present invention as shown in FIG. 1, a spread spectrum signal generated by a second data symbol will have its initial starting point offset from the starting point of the spread spectrum signal generated by the first data symbol. In the specific example as shown in FIG. 1, the spread spectrum signal generated by the first data symbol is indicated at starting at the first designated slot of the M slots, see FIG. 1(b). The spread spectrum signal generated by the second data symbol, however, has its frame begin after these M slots, see FIG. 1(c).

In one operation of the present invention, the first pseudo noise code is provided in FIG. 1(b), and an inverse of the first pseudo noise code is provided in FIG. 1(c). That is, the inverted pseudo noise code (which is denoted as "−1, −1, −1, 1, 1, −1, 1"), which code is an inversion of the first pseudo noise code (denoted as "1, 1, 1, −1, −1, 1, −1), is also inserted into L slots starting from the selected slot for generation of a second spread spectrum pulse position modulating signal. FIG. 1(c) shows a case in which N=4, L=7, and j=0, and the start position of the N slots is the M+1-th slot from the start of the frame. In the example of FIG. 1(c), the pattern of the inverted pseudo noise code denoted as "1, 1, 1, −1, −1, 1, −1" is inserted into a slot designated 1 (i.e., after the first slot) of the desired transmission data N' after being differential-coded.

The first and second spread spectrum pulse position modulating signals generated as discussed above are then added together, to obtain a third spread spectrum pulse position modulating signal composed of five values, 0, ±1, and ±2, for use as a transmission signal, as shown in FIG. 1(d). This provides the benefit in the present invention, that the data can be transmitted twice as fast as in background systems.

The added together spread spectrum signal of FIG. 1(d) is then transmitted and received at a receiver. At the receiver the added together spread spectrum signal of FIG. 1(d) passes through a matched filter corresponding to the pseudo noise code that has been used for the spread spectrum. The matched filter causes a positive matched pulse when matched in phase with that of the pseudo noise code, and a negative matched pulse when matched in phase with that of the inverted pseudo noise code, to generate the signal as shown in FIG. 1(e). As shown in FIG. 1(e), the first data symbol of FIG. 1(b) provides a pulse having a positive peak and the second data symbol of FIG. 1(c) provides a pulse having a negative peak without fail in a base band system. Further, the pulses are produced at respective slots selected in accordance with the data when modulated. Therefore, the first data symbol can be regenerated by measuring a separation or interval between two adjacent positive pulses, while the second data symbol can be regenerated by measuring a separation or interval between two adjacent negative pulses.

As previously described, according to the communication operation employing the spread spectrum pulse position modulation of the above embodiment, one kind of pseudo noise code is used for spreading transmission data, and the pseudo noise code and its inverted pseudo noise code are used for two individual data symbols, respectively, such that each of the data symbols is subject to spread spectrum pulse position modulation individually. Therefore, high-speed data transmission can be realized, for example of twice as fast as in a background system when the value M is set equal to the value N. Otherwise, the data transmission can be realized at a speed close to that in the background system with a spread bandwidth reduced by one-half.

In the communication operation employing the spread spectrum pulse position modulation of the above embodiment, a Baker series can be used as the pseudo noise code for spreading transmission data. Since a Baker series has a limited length it is effective in making cross-correlation smaller than an ordinary periodic series, such as an M-sequence, in the structure of the present invention in which the pseudo noise code is used in each cycle. Exemplary pattern types of the Baker series are a 7-chip type denoted as "1, 1, 1, −1, −1, 1, −1" and an 11-chip type denoted as "1, 1, 1, −1, −1, −1, 1, −1, −1, −1". The use of such a Baker series makes cross-correlation smaller than in an ordinary periodic series such as an M-sequence, so that an error rate can be reduced, to thereby improve transmission performance.

In the communication operation employing the spread spectrum pulse position modulation of the above embodiment, the frame length (M+L−1+j) can be set to be equal to or greater than a sum of M and N so that the M slots and the N slots are put in a position not to overlap with each other.

By setting the frame length (M+L−1+J) to a value equal to or greater than a sum of M and N, positive and negative peak outputs of the matched filter in a receiver can be prevented from overlapping with each other. Therefore, a peak decision is made easier, and hence a structure of a receiver is simplified, thus reducing a cost of the receiver. In addition, since an error rate can be reduced, transmission performance can also be improved.

FIG. 1(f) provides an overview of the operation of the present invention as discussed above with respect to FIGS. 1(a)–1(e). As shown in FIG. 1(f), an input data signal is converted to two data symbols by a serial to parallel converter, and one data symbol is sent to a first pulse position modulator and PN coder 10 which takes the first symbol and subjects the first symbol to a first pulse position modulation by a first pseudo noise code, to output the signal as shown in FIG. 1(b). The second symbol is also input to a second pulse position modulator with an inverted PN coder 20 which subjects the second symbol to a second pulse position modulation by the inverted pseudo noise code, to output the signal as shown in FIG. 1(c). The signals output of the first pulse position modulator with PN coder 10 and the second pulse position modulator with the inverted PN coder 20 are then added together in a adder 30. The output of this adder 30 is a signal which corresponds to that shown, for example, in FIG. 1(*d*) of the present specification.

This signal output of adder 30 can then be transmitted, for example, by radio transmission, to a demodulator 40. The demodulator 40 includes a matched filter which outputs positive and negative pulse signals corresponding to the first data symbol and second data symbol. That is, the output of this matched filter of this demodulator 40 corresponds to that shown in FIG. 1(*e*) of the present specification. The demodulator 50 then further operates to output the original input data signal. This FIG. 1(*f*) is an overview of the operation of the present invention, which is explained in further detail below.

A description will now be made with respect to a circuit structure and operation of a spread spectrum pulse position modulation transmitter (of a base band type) for communication using spread spectrum signals with such a frame structure as discussed above in FIG. 1. FIG. 2 is a block diagram showing a structure of such a spread spectrum pulse position modulation transmitter according to the present invention.

According to FIG. 2, a spread spectrum pulse position modulation transmitter is provided in which data signals to be transmitted are subject to spread spectrum pulse position modulation and consecutive frames are sent continuously, one frame including M+L−1+j slots. The transmitter includes a first differential coder 201 in which a first data symbol having an M state is input as transmission data and is differential-coded so that a first data symbol value is output. A second differential coder 204 is provided in which a second data symbol having an N state is input as transmission data and is differential-coded so that a second data symbol value is output.

A first pulse position modulation circuit 207 selects one slot from a consecutive M slots within the one frame during each frame cycle in accordance with the first data symbol value to output a first pulse position modulating signal. A second pulse position modulation circuit 210 selects one slot from a consecutive N slots within the one frame during each frame cycle in accordance with the second data symbol value to output a second pulse position modulating signal.

A first pseudo noise code generator 213 uses the first pulse position modulating signal as a trigger signal to output a one-cycle pseudo noise code having a period L, spread across L slots starting from the slot selected from the M slots, for outputting a first spread spectrum pulse position modulating signal (to output the signal shown in FIG. 1(*b*), as an example). A second pseudo noise code generator 214 uses the second pulse position modulating signal as a trigger signal to output a one-cycle inverted code of the pseudo noise code having the period L, spread across L slots starting from the slot selected from the N slots, for outputting a second spread spectrum pulse position modulating signal (to output the signal shown in FIG. 1(*c*), as an example). An adder 215 receives the first spread spectrum pulse position modulating signal and the second spread spectrum pulse position modulating signal to add them together so that a third spread spectrum pulse position modulating signal is output (to output the signal shown in FIG. 1(*d*), as an example).

In a case in which transmission data is to be serially input, the spread spectrum pulse position modulation transmitter can further include a serial/parallel converter 200 as shown in FIG. 2, which converts a fixed number of transmission data into the first data symbol having the M state and the second data symbol having the N state while the transmission data is input serially.

In a case in which the third spread spectrum pulse position modulating signal is to be input as a base band signal, converted into a high-frequency modulated signal, and then transmitted by radio, the spread spectrum pulse position modulation transmitter of FIG. 2 can further include a frequency conversion and amplification section 218 which receives the third spread spectrum pulse position modulating signal input as a base band signal and which converts the third spread spectrum signal into a high-frequency modulated signal. Further, an antenna 223 radiates the high-frequency modulated signal. If the spread spectrum pulse position modulation transmitter of FIG. 2 is not used for radio transmission, the frequency conversion and amplification section 218 and the antenna 223 are not needed.

Further details of the spread spectrum pulse position modulation transmitter of FIG. 2 will now be described below along with the operations thereof.

When data is input serially, the serial/parallel converter (e.g., a shift register with a parallel output function) 200 converts a fixed bit-number of serial data into data symbols having M and N states, respectively. Specifically, the serial parallel converter 200 is operated by an input data clock (DCLK), described later, to read transmission data one by one from its serial input, and then to read out the read data in each frame in parallel by using a frame clock as a trigger signal, in which a portion of bit strings is selected for the first data symbol having the M state and a remaining portion thereof is selected for the second data symbol having the N state. By taking into account an efficiency of conversion, it is desirable to use values of M and N which are of a power of 2.

As previously described, the first data symbol having the M state and the second data symbol having the N state are prepared as information signals to be converted by the serial/parallel converter 200 for transmission. Then, a first data symbol Mi is converted by the differential coder 201 into a differential-coded data symbol Mi'. As shown in FIG. 2, the differential coder 201 is formed of an adder 202 and a register 203, in which Mi'+Mi is divided by M and a remainder is set as a new register value. The register 203 is synchronized with a frame clock (FCLK) from a clock generator 216. Similarly, a second data symbol Ni is converted by the differential coder 204, formed of an adder 205 and a register 206, into a differential-coded data symbol Ni'.

Then, the pulse position modulation circuit 207 selects one slot from the consecutive M slots within one frame of M+L−1+j slots during each frame cycle in accordance with the differential-coded first data symbol Mi' so that a first pulse position modulating signal is obtained. As shown in FIG. 2, the pulse position modulation circuit 207 is formed of a counter 208 with a parallel input and an equivalent comparator circuit 209. The counter 208 is driven by a pseudo noise code clock (PCLK) from the clock generator 216 to read in the data symbol Mi' from its parallel input terminals and set it as an initial value so that the read value is transmitted by the frame clock signal during each frame cycle. After the data symbol Mi' is read in, the counter 208 is operated as a down-counter. Alternatively, the counter 208 may be an up-counter.

The equivalent comparator circuit 209 uses a specific compare value Mr to output a pulse only when the output value of the counter 208 matches with the compare value Mr. If the compare value is 0, a matched pulse is output after Mi' clock, in which the pulse generated is a pulse having a position modulated by the data symbol, Mi'.

Similarly, with the second data symbol, a second pulse position modulating signal is generated in pulse position modulation circuit 210, in correspondence to the data symbol Ni', by a counter 211 and an equivalent comparator circuit 212 having a compare value Nr.

To allow for an easy demodulating operation, the compare values Mr, Nr used in the respective equivalent comparator circuits 209, 212 could be set such that positions of two pulse position modulated pulse signals never overlap with each other. For example, when Mr is set to 0 and Nr is set to −4, a pulse corresponding to the first data symbol is entered at any one of the 0 slot to fourth slot numbered from a start of a frame, while a pulse corresponding to the second data symbol is entered at any one of the fifth to eighth slots numbered from a start of a frame. Thus, two pulses can be prevented from overlapping with each other.

The first pseudo noise code generator 213 uses the first pulse position modulating signal as a trigger signal to output a one-cycle pseudo noise code having a period L, spread across L slots starting from the slot at which the corresponding pulse has occurred (to output the signal as shown in FIG. 1(*b*), as an example).

Figure 3B:
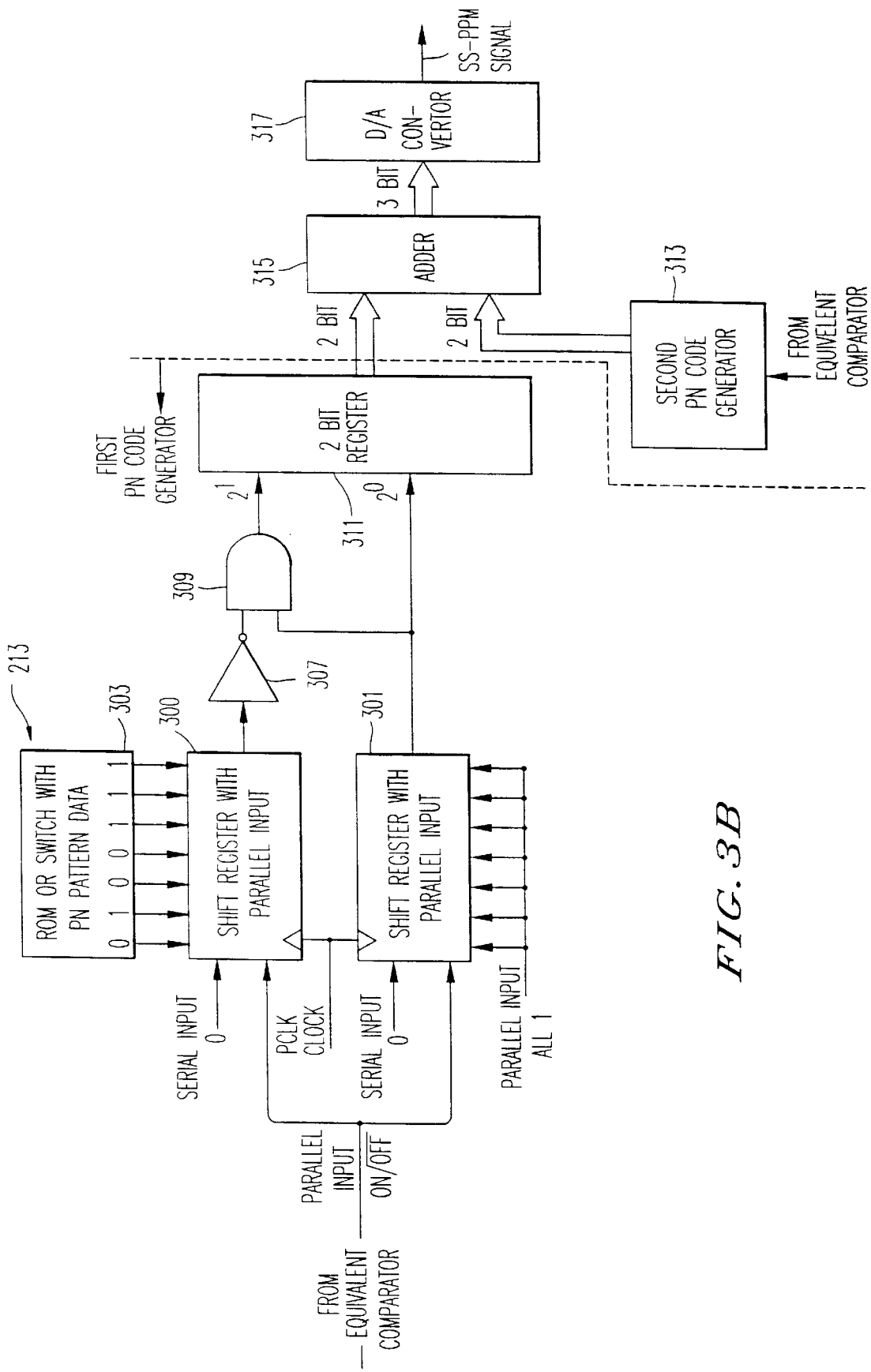

The pseudo noise code generator 213 may be designed with various types of structures. FIG. 3 shows an example of the pseudo noise code generator 213. As shown in FIG. 3, the pseudo noise code generator 213 mainly includes two shift registers 300, 301 each provided with a parallel input and having a number of stages which is made correspondent to the length of the pseudo noise code (7 bits in the example provided). One shift register 300 receives the pattern of the pseudo noise code through its parallel input terminals from a ROM or switch 303 with the pseudo noise code, whereas the parallel input terminals of the other shift register 301 are all set to 1. On the other hand, serial inputs of both shift registers 300, 301 are set to 0, respectively. Such shift registers 300, 301 are generally driven by the pseudo noise code clock (PCLK) from the clock generator 216 to repeat their shift operation. Outputs of the shift registers 300, 301 normally remain at the value 0 because the serial input thereof are kept at 0, respectively.

In this condition, an input pulse from the equivalent comparator circuit 209 operates both the shift registers 300, 301 to read in data from their parallel input terminals, respectively, for a shift operation. Then, the shift register 300 outputs the one-cycle pseudo noise code, and the shift register 301 holds a high level while the pseudo noise code is being output. The signal of the pseudo noise code from the shift register 300 is input to a three-state buffer 302, and the signal from the shift register 301 is used as a control signal for ON an OFF operations of the three-state buffer 302, so that the first spread spectrum pulse position modulating signal, composed of three values, 0 and ±1, can be generated.

Similarly, the second spread spectrum pulse position modulating signal is generated at the second pseudo nosie code generator 214 by using the second pulse position modulating signal as a trigger signal (to output the signal shown in FIG. 1(*c*), as an example). The pattern to be generated by the second pseudo noise code generator 214 is an inverted version of the pseudo noise code generated by the first pseudo noise code generator 213.

FIG. 3(*b*) shows a further example of a pseudo noise code generator 213. The difference between the embodiment shown in FIG. 3(*b*) and the embodiment in FIG. 3(*a*) is that the embodiment shown in FIG. 3(*b*) includes further circuitry following the shift registers 300, 301. More specifically, in the further embodiment of FIG. 3(*b*) an inverter 307 receives the output of the shift register 300. An output of this inverter 307 and an output from the shift register 301 are then fed to AND gate 309. An output of shift register 301 and an output of the AND gate 309 are then input to a 2-bit register 311. An output of this 2-bit register 311 is supplied to an adder 315, which also receives an output from a second PN code generator 313. An output of the adder 315 is then provided to a digital to analog converter 317, which then outputs the same third spread spectrum pulse position modulation signal as in the embodiment of FIG. 3(*a*).

In this embodiment of FIG. 3(*b*), by providing the further circuitry therein, outputs are converted to two bit amplitude data (0,±1) using the inverter 307 and the AND gate 309, and such data is then stored in the 2-bit register 311. The second PN code generator 313 also outputs two bit amplitude data. The adding process in the adder 315 is performed by a digital adder, as an example, and such output data is then converted to an analog signal by the D/A converter 317. With this further structure as shown in FIG. 3(*b*), the output signal from D/A converter 317 becomes the third spread spectrum pulse position modulation signal which can take on values of (0,±1,±2).

Again with reference to FIG. 2, the adder 215 adds the first and second spread spectrum pulse position modulating signals to obtain the third spread spectrum pulse position modulating signal (to output the signal shown in FIG. 1(*d*), as an example) so that the two data symbols can be transmitted in parallel.

The frequency conversion and amplification section 218 converts the third spread spectrum pulse position modulating signal into a high-frequency modulated signal to be transmitted by radio. Specifically, the frequency conversion is made at a multiplier 220 by inputting both the third spread spectrum pulse position modulating signal generated as a base band signal, and a carrier wave from a local oscillator 219. Then, the output of the multiplier 220 is amplified by an amplifier 221, filtered by a filter 222, and radiated through the antenna 223. The third spread spectrum pulse position modulating signal is thus transmitted by radio. This section 218 can be altered if transmission is not to take place by radio.

According to the above-discussed operation. The spread spectrum pulse position modulation transmitter needs three kinds of synchronous clocks, DCLK, PCLK and FCLK, as shown in FIG. 2. Therefore, the spread spectrum pulse position modulation transmitter of FIG. 2 includes the clock generator 216 and a reference oscillator 217, in which the clock generator 216 generates the pseudo noise code clock (PCLK), the frame clock (FCLK), and the input data clock (DCLK) by referring to a clock signal (SCLK) from the reference oscillator 217.

Figure 4:
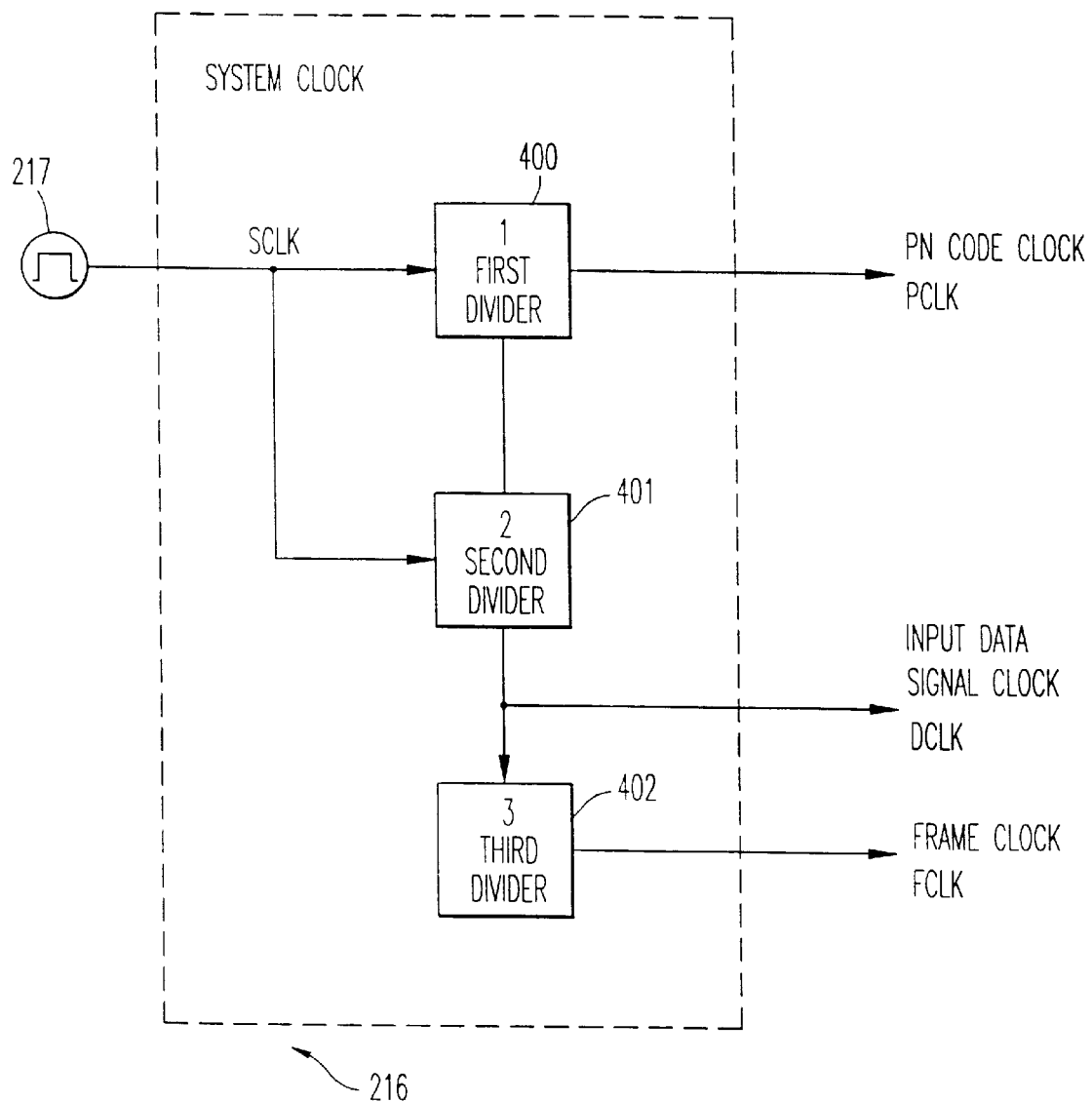
FIG. 4 is a block diagram showing an exemplary clock generator used in a spread spectrum pulse position modulation transmitter according to an embodiment of the present invention.

FIG. 4 is a block diagram showing a structure of an implementation of the clock generator 216. Referring to FIG. 4, the clock signal (SCLK) from the reference oscillator 217 is input to first and second dividers 400 and 401 so that the pseudo noise code clock (PCLK) and the input data signal clock (DCLK) are generated. Then, the input data signal clock (DCLK) is further divided by a third divider 402 so that the frame clock (FCLK) is generated. Each division rate of the dividers 400, 401, and 402 may be set to satisfy the following conditions:

DCLK=FCLK×K, and

PCLK=FCLK×(frame length), where K is a number of transmission data bits per frame. The first divider 400 may not be required in some cases, in which the PN code clock PCLK is equal to SCLK.

As previously described, according to the spread spectrum pulse position modulation transmitter of FIG. 2, two multi-valued data symbols can be transmitted concurrently in response to each frame clock, and this prevents data bits from shifting.

In the spread spectrum pulse position modulation transmitter of FIG. 2, a Baker series can be used as the pseudo noise code for spreading transmission data. Since a Baker series has a limited length, it is effective in making cross-correlation smaller than an ordinary periodic series, such as an M-sequence, in the structure of the present invention in which the pseudo noise code is used in each cycle. Exemplary pattern types of the Baker series are a 7-chip type denoted as "1, 1, 1, −1, −1, 1, −1" and an 11-chip type denoted as "1, 1, 1, −1, −1, −1, 1, −1, −1, 1, −1". The use of such a Baker series makes cross-correlation smaller than an ordinary periodic series such as the M-sequence, so that an error rate can be reduced, to thereby improve transmission performance.

In the spread spectrum pulse position modulation transmitter FIG. 2, the frame length (M+L−1+j) can also be set to be equal to or greater than a sum of M and N so that the M slots and the N slots are put in a position not to overlap with each other.

By setting the frame length (M+L−1+j) to a value equal to or more than a sum of M and N, positive and negative peak outputs of a matched filter in a receiver can be prevented from overlapping with each other. Therefore, a peak decision is made easier, and hence a structure of the receiver is simplified, thus reducing a cost of the receiver. In addition, since an error rate can be reduced, transmission performance can also be improved.

Figure 5:
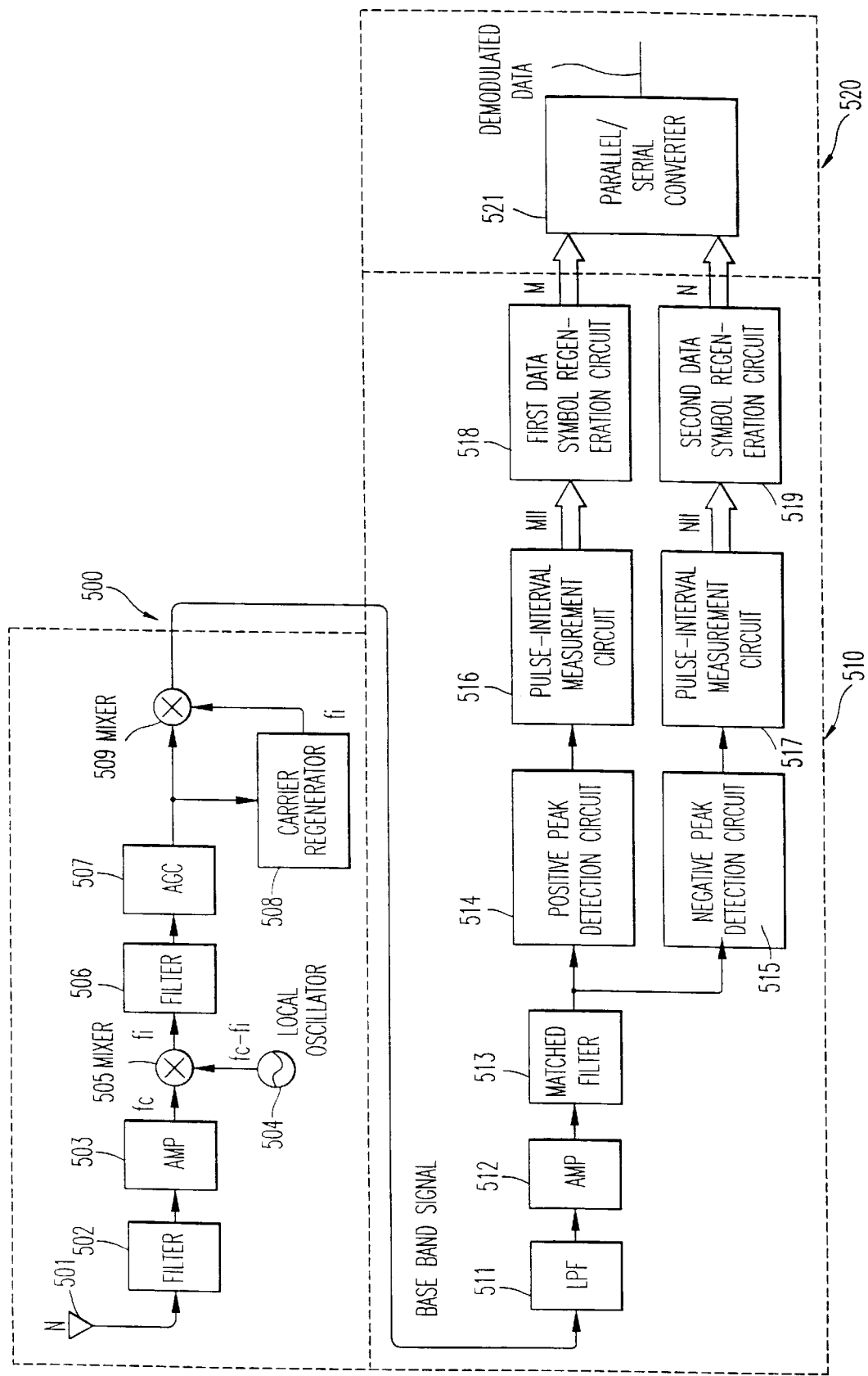
FIG. 5 is a block diagram showing a structure of a spread spectrum pulse position modulation receiver according to an embodiment of the present invention.

A spread spectrum pulse position modulation receiver, which receives signals from the spread spectrum pulse position modulation transmitter of FIG. 2 to regenerate original first and second data symbols having M and N states, respectively, will now be described with reference to FIG. 5. FIG. 5 is a block diagram showing a structure of such a spread spectrum pulse position modulation receiver according to the present invention.

As shown in FIG. 5, a spread spectrum pulse position modulation receiver is provided, which receives the third spread spectrum pulse position modulating signal (for example as shown in FIG. 1(*d*)) from the spread spectrum pulse position modulation transmitter of FIG. 2 and which demodulates the third spread spectrum pulse position modulating signal for regenerating the first data symbol having the M state and the second data symbol having the N state. The device of FIG. 5 includes a matched filter 513 which receives signals from the spread spectrum pulse position modulation transmitter of FIG. 2 to output a positive matched pulse (see for example the positive pulses of FIG. 1(*e*)) in response to an input of the first spread spectrum pulse position modulating signal and to output a negative matched pulse (see for example the negative pulse of FIG. 1(*e*)) in response to an input of the second spread spectrum pulse position modulating signal that is the inverted version of the first spread spectrum pulse position modulating signal, so that positive and negative pulse position modulating signals are regenerated.

A positive peak detection circuit 514 detects a positive peak in response to an input of the positive matched pulse to output the positive peak detection signal after conversion into a first digital pulse position modulating signal. A negative peak detection circuit 515 detects a negative peak in response to an input of the negative matched pulse to output the negative peak detection signal after conversion into a second digital pulse position modulating signal. A first pulse-interval measurement circuit 516 receives the first digital pulse position modulating signal to measure a pulse interval of the first digital pulse position modulating signal so that a first digital count signal is output. A second pulse-interval measurement circuit 517 receives the second digital pulse position modulation signal to measure a pulse interval of the second digital pulse position modulating signal so that a second digital count signal is output.

A first data symbol regeneration circuit 518 regenerates the first data symbol having the M state from the first digital count signal. A second data symbol regeneration circuit 519 regenerates the second data symbol having the N state from the second digital count signal.

In a case in which the first and second data symbols having the M and N states, respectively, are demodulated by the spread spectrum pulse position modulation receiver of FIG. 5 and are to be serially output, the spread spectrum pulse position modulation receiver of FIG. 5 can further include a parallel/serial conversion section 520 for converting the first data symbol having the M state and the second data symbol having the N state into serial data having a fixed number of bits to be output.

In a case in which the frequency conversion and amplification section 218 is provided in the spread spectrum pulse position modulation transmitter of FIG. 2 for converting the third spread spectrum pulse position modulating signal into a high-frequency modulated signal to be output to the spread spectrum pulse position modulation receiver of FIG. 5, the pulse position modulation receiver of FIG. 5 can further include an antenna 501 for receiving the high-frequency modulated signal and a frequency conversion and amplification section 500 for synchronously demodulating the high-frequency modulated signal received by the antenna 501 into a base band signal.

In other words, the frequency conversion and amplification section 500 and the antenna 501 are provided only when the spread spectrum pulse position modulation receiver of FIG. 5 is used for radio communication. If the spread spectrum pulse position modulation receiver of FIG. 5 is not used for radio transmission, and base-band spread spectrum pulse position modulating signals are exchanged between the transmitter and the receiver, the frequency conversion and amplification section 500 and the antenna 501 are not needed.

Further details of the spread spectrum pulse position modulation receiver of FIG. 5 will now be described below along with an operation that can be divided into the following sections of frequency conversion and amplification section 500, spread spectrum pulse position modulation (SS-PPM) system demodulation section 510, and parallel/serial conversion section 520.

The spread spectrum pulse position modulation receiver shown in FIG. 5 includes the frequency conversion and amplification section 500 having a reception end which receives the high-frequency modulated signal from the spread spectrum pulse position modulation transmitter of FIG. 2 to demodulate the received signal into a base band signal synchronously. In the receptor end, an antenna 501 first receives the high-frequency modulated signal radio transmitted from the spread spectrum pulse position modulation transmitter of FIG. 2. The received signal is filtered by a filter 502 and is then amplified by an amplifier 503. Then, a frequency conversion section including a local oscillator 504 and a mixer 505 converts the output signal from the amplifier 503 into an intermediate-frequency signal. The intermediate-frequency signal passes through a filter 506 and a gain control amplifier (AGC amplifier) 507 and is thereby amplified to be a constant-level signal.

The amplified signal is then divided into two signals. A first signal is input to a carrier regenerator 508 for regenerating the carrier and a second signal is input to a mixer 509 and is multiplied by the regenerated carrier signal fi, so that a base-band spread spectrum pulse position modulating signal is regenerated. The spread spectrum pulse position modulating signal is demodulated by the spread spectrum pulse position modulation system demodulation section 510 as described below.

The spread spectrum pulse position modulation (SS-PPM) system demodulation section 510 will now be described. At first, the output of the frequency conversion and amplification section 500 is filtered by a lowpass filter 511 and is then amplified by an amplifier 512 according to need. Then, a matched filter 513 regenerates the pulse position modulating signals from the output of the amplifier 512, as discussed above.

Figure 6:
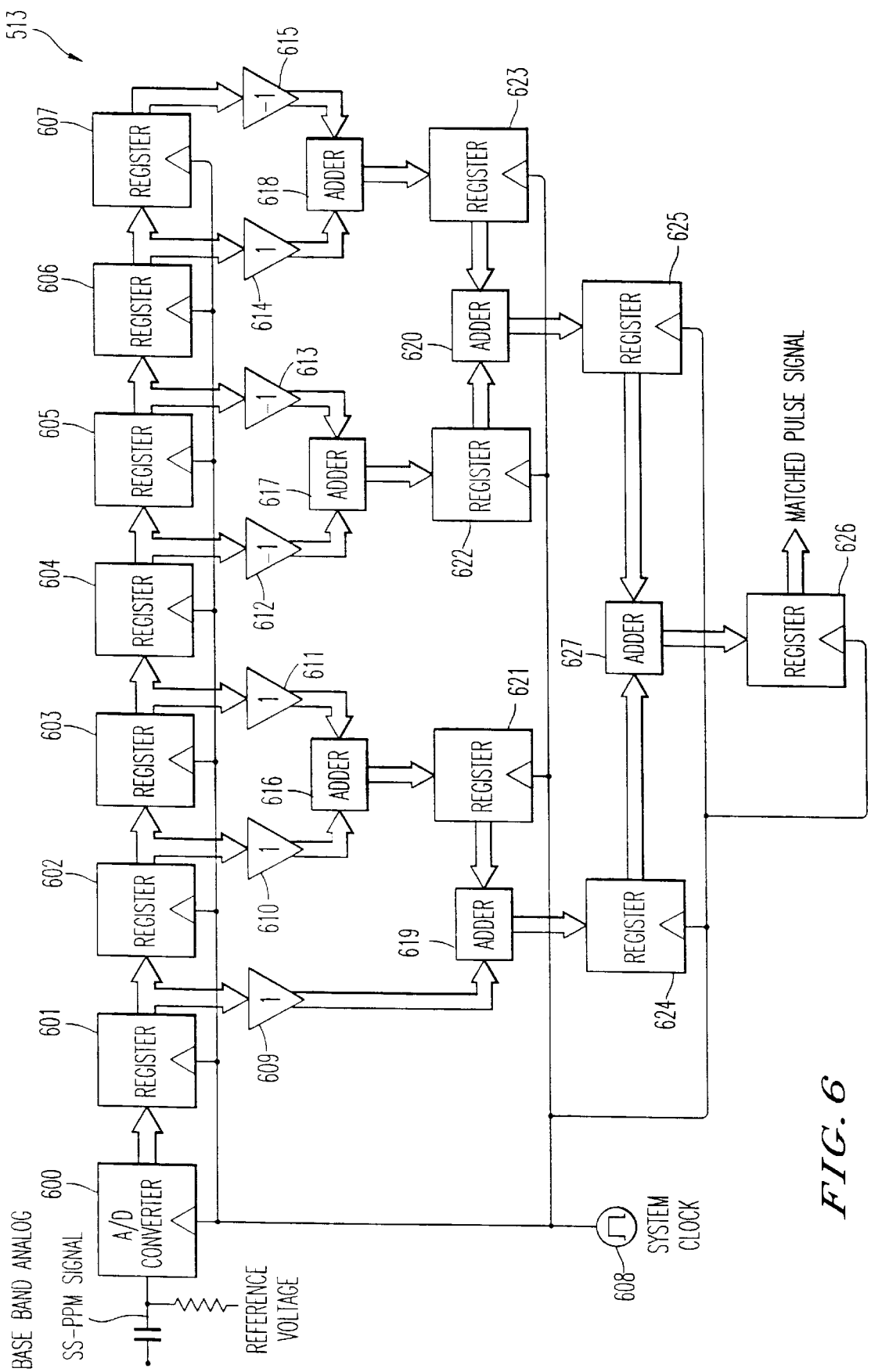
FIG. 6 is a block diagram showing a structure of a matched filter used in a spread spectrum pulse position modulation receiver according to an embodiment of the present invention.

At least the following types of structures can be used for the matched filter 513. One structure is an analog matched filter constituted of elements such as SAWs or CCDs. Another structure is a digital matched filter constituted with a digital signal processing, in which an A/D converter converts outputs into digital signals. FIG. 6 is a block diagram showing a structure of the matched filter 513 when implemented by a digital matched filter.

In the matched filter 513 of FIG. 6, an A/D converter 600 first converts a received analog signal into a digital signal. The matched filter 513 further includes registers 601–607 connected in serial, the number of which corresponds to an integral multiple of the length of the pseudo noise code (which changes according to the number of sampling per slot time) for storing A/D converted data during one cycle of the pseudo noise code. Outputs of all the registers 601–607 are read out in response to each system clock output from a system clock oscillator 608. Multipliers 609–615 multiply the outputs of the registers 601–607 by tap counts determined by the pattern of the pseudo noise code, respectively. The example shown in FIG. 6 has respective tap counts 1, 1, 1, −1, −1, 1, −1 corresponding to the pseudo noise code. Then, adders 616–620 and 627 add the outputs of the multipliers 609–616 in order so that a matched pulse can be obtained.

In the matched filter 513 of FIG. 6, respective tap counts are multiplied by the output of the register 601 at the multiplier 609, by the output of the register 602 at the multiplier 610, by the output of the register 603 at the multiplier 611, by the output of the register 604 at the multiplier 612, by the output of the register 605 at the multiplier 613, by the output of the register 606 at the multiplier 614, and by the output of the register 607 at the multiplier 615. The outputs of the multipliers 610 and 611 are added at the adder 616 and output to a register 621. The outputs of the multipliers 612 and 613 are added at the adder 617 and output to a register 622. The outputs of the multipliers 614 and 615 are added at the adder 618 and output to a register 623.

The outputs of the multiplier 609 and the register 621 are added at the adder 619 and output to a register 624. The outputs of the registers 622 and 623 are added at the adder 620 and output to a register 625. The outputs of the registers 624 and 625 are added at the adder 627 and output to a register 626. Thus, the matched filter is obtained.

In a case in which the pseudo noise code whose pattern is identical to that of the tap counts is input to the matched filter 513, while consecutive code values of the pseudo noise code are read in a string of registers serially in order, both the input series and the tap counts become in phase with each other at a time, and all the input data to the adders are made positive or negative, thus obtaining the matched pulse signals. With this matched filter 513 according to the present invention, when the signal as shown in FIG. 1(d) is received, both the negative and positive pulses are output, as shown in FIG. 1(e).

Returning to FIG. 5, an operation of the spread spectrum pulse position modulation receiver will now be further described. The matched pulse signals successively generated by the matched filter 513 are branched into two paths. One branch is input to the positive peak detection circuit 514 and is converted into a first digital pulse position modulating signal and the other branch is input to the negative peak detection circuit 515 and is converted into a second digital pulse position modulating signal.

Then, the first and second digital pulse position modulating signals are input to the first and second pulse-interval measurement circuits 516 and 517, respectively, in which each interval between pulses of the first and second digital pulse position modulating signals is measured so that digital count signals M" and N" are obtained, respectively. The digital count signal M" is input to the first data symbol regeneration circuit 518 and the digital count signal N" is input to the second data symbol regeneration circuit 519. Thus, the original data symbols, the first data symbol having the M state and the second data symbol having the N state, are regenerated.

The peak detection circuits 514 and 515 can be designed with various types of structures. One digital structure of a digital peak detection circuit 514 is shown with reference to FIG. 7.

Figure 7:
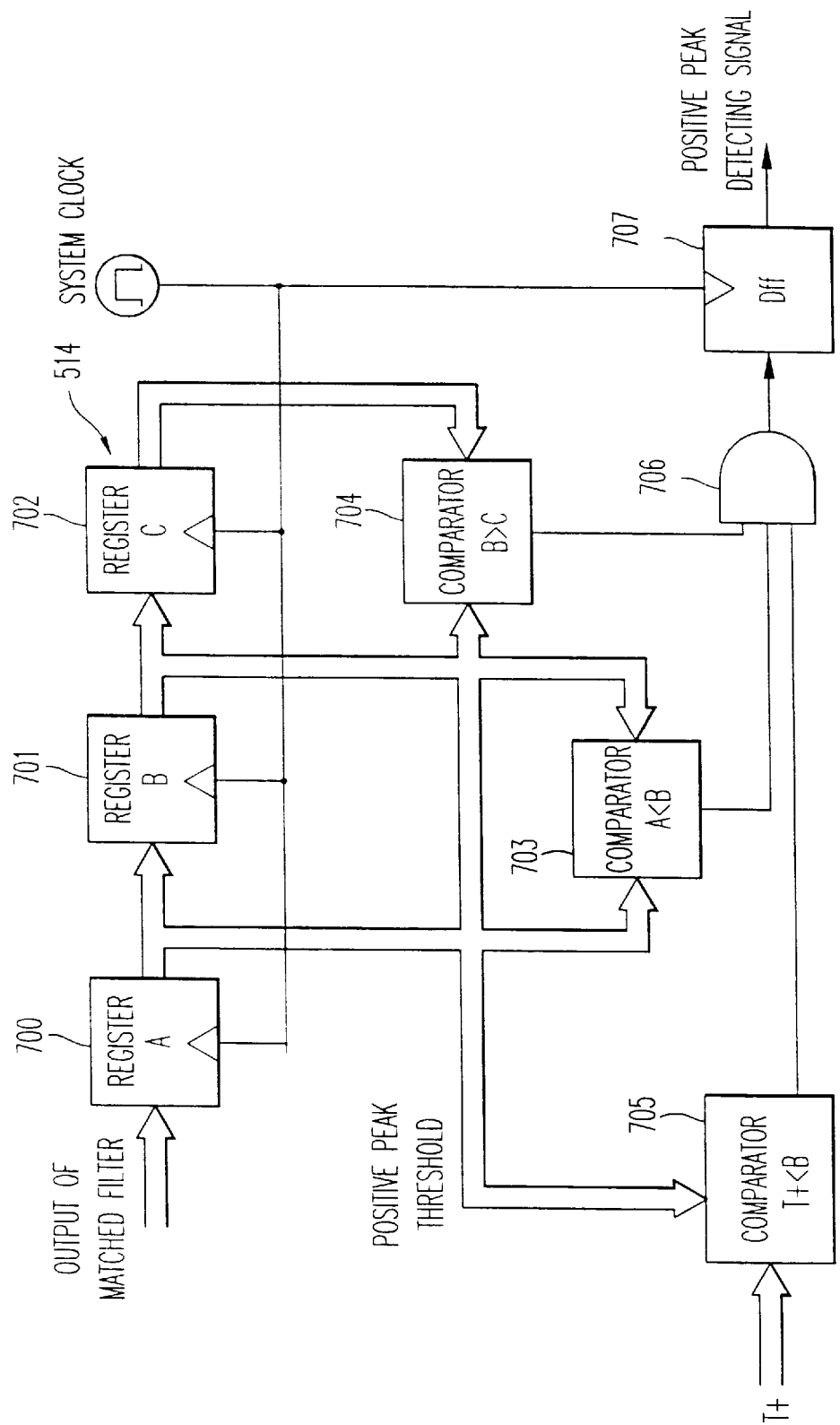
FIG. 7 is a block diagram showing a structure of a positive peak detection circuit used in a spread spectrum pulse position modulation receiver according to an embodiment of the present invention.

FIG. 7 is a block diagram showing a structure of the positive peak detection circuit 514. As shown in FIG. 7, the positive peak detection circuit 514 is configured on an assumption that the matched pulses are sampled at a speed twice as fast as the pseudo noise code clock in the transmitter of FIG. 2. At first, matched pulse data converted by an A/D converter into digital signals or output data from the matched filter 513 are successively input to an input terminal (not shown) of the peak detection circuit 514. The data input to the peak detection circuit 514 is transferred to registers 700, 701 and 702 in this order in response to each clock pulse so that three consecutive sampling data are stored.

In the positive peak detection circuit 514 of FIG. 7, a comparator 703 compares a value A of the register 700 with a value B of the register 701. A comparator 704 compares the value B of the register 701 with a value C of the register 702. A comparator 705 compares the value B of the register 701 with a positive peak threshold T+. In this case, a positive peak detecting signal is output through an AND gate 706 and a D-flip flop 707 only when the value B of the register 701 is judged to be the largest value by all the three comparators 703 to 705.

With the negative detection circuit 515, the outputs of the comparators 703 need to be inverted between positive and negative. Further, the threshold must be changed to T−, otherwise, operations in the negative detection circuit 515 correspond to those noted above in the positive peak detection circuit 514.

Figure 8:
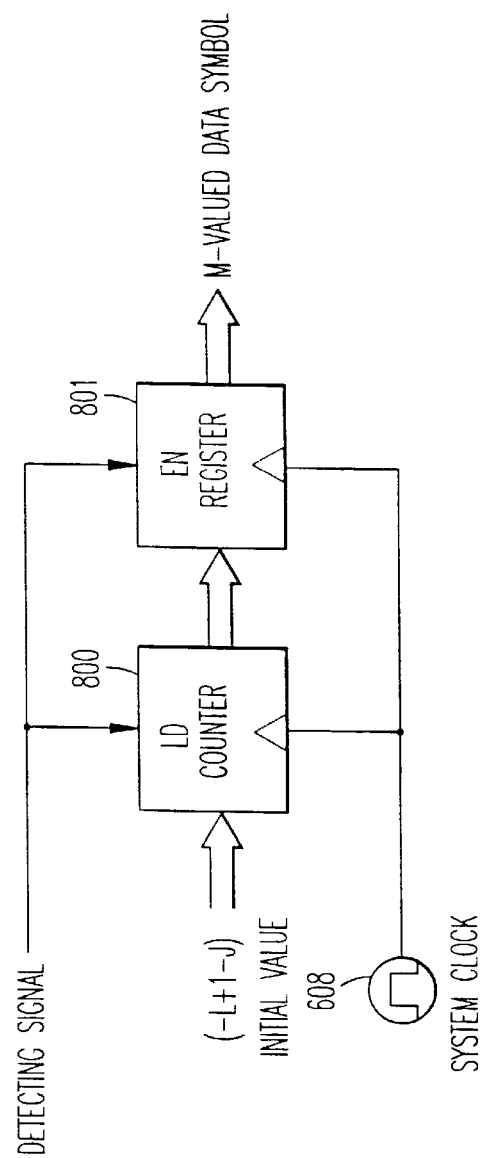
FIG. 8 is a block diagram showing an arrangement of a pulse-interval measurement circuit and a data symbol regeneration circuit used in a spread spectrum pulse position modulation receiver according to an embodiment of the present invention.

The first and second pulse-interval measurement circuits 516, 517, and the first and second data symbol regeneration circuits 518, 519 can also be designed with various types of circuit structures. A circuit structure shown in FIG. 8 is taken by way of example to describe the pulse-interval measurement circuit 516 and the first data symbol regeneration circuit 518. As shown in FIG. 8, the circuit is formed of a counter 800 and a register 801. The circuit of FIG. 8 reads in data from parallel input terminals in response to an input of the peak detecting signal from the positive peak detection circuit 514. The value of the counter 800 when the data is read in is stored in the register 801 as a measured value of the peak interval. If no peak detecting signal is input, only the counter 800 is synchronized with the system clock signal and operated.

In FIG. 8, the initial value of the counter is set to −L+1−j. Therefore, the value when the count is finished for one frame is equal to the value M of the original data symbol, and this allows the first data symbol regeneration circuit 518 to be eliminated.

The spread spectrum pulse position modulation receiver of FIG. 5 further includes the parallel/serial conversion section 520 provided with a parallel/serial converter 521, to which the first data symbol having the M state and the second data symbol having the N state are input from the first and second data symbol regeneration circuits 518, 519, respectively, so that both the data symbols are demodulated and output as serial data.

As described above, according to the spread spectrum pulse position modulation receiver of FIG. 5 one matched filter 513 is used for generation of both matched pulses of the pseudo noise code and the inverted pseudo noise code, so that the data can be received at a speed twice as fast with a circuit scale similar to that of a background receiver which does not utilize the inverted pseudo noise code, thereby reducing a cost of the receiver of FIG. 5 of the present invention. Further, two multi-valued data symbols can be demodulated concurrently in response to each frame clock, and this prevents data bits from shifting.

Figure 9A:
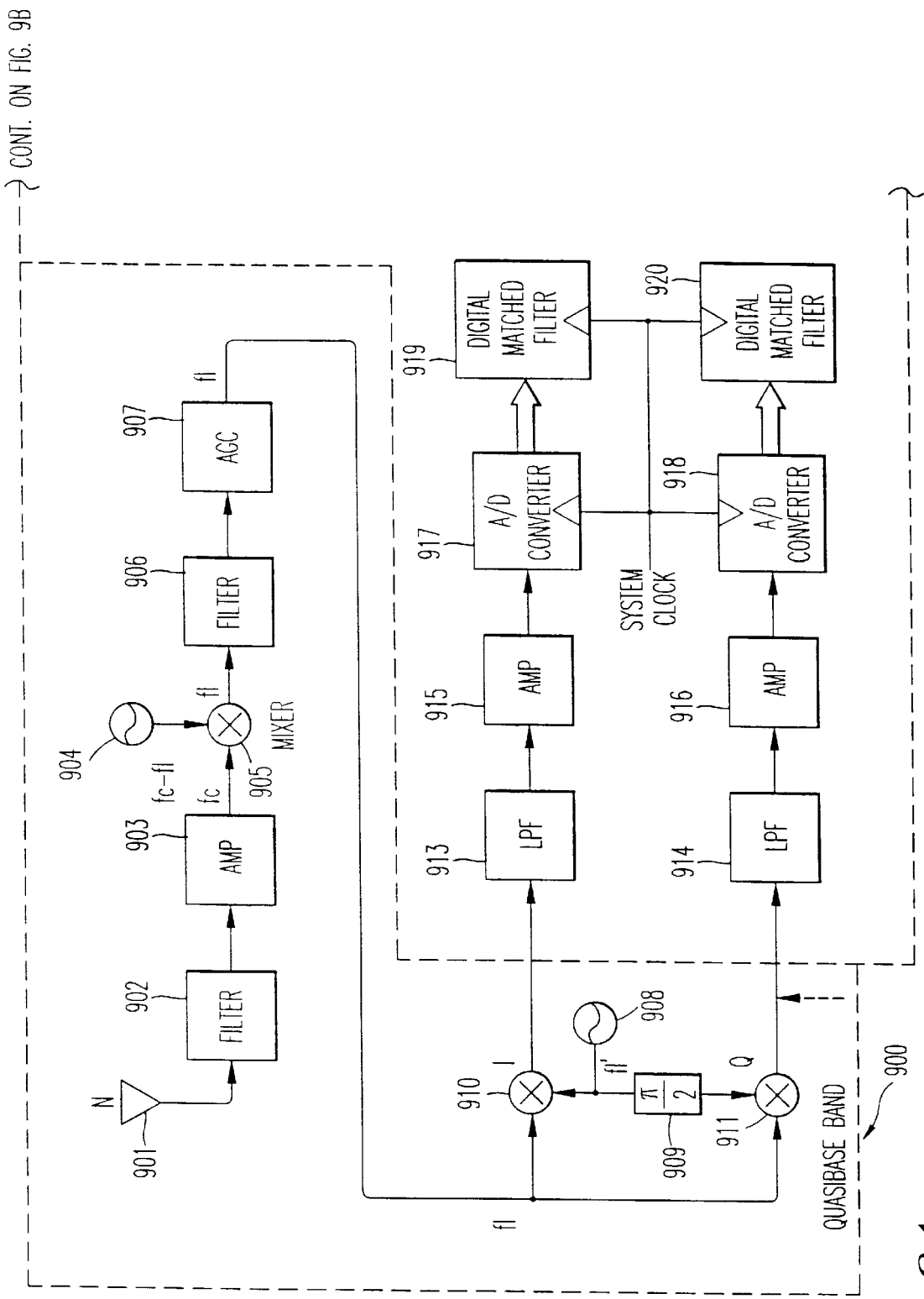
FIG. 9 is a block diagram showing a structure of a spread spectrum pulse position modulation receiver according to an embodiment of the present invention.
Figure 9B:
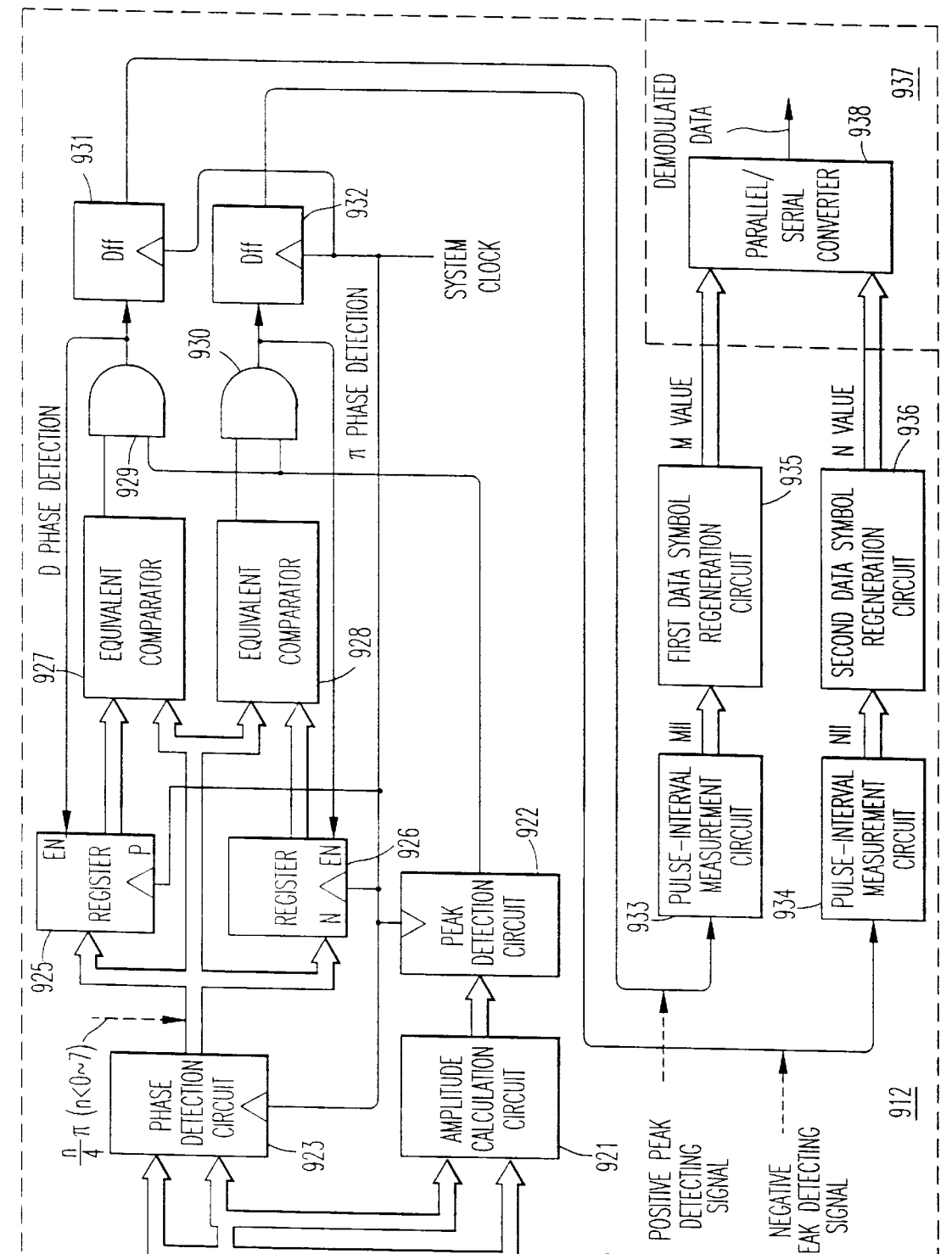

A further embodiment of the present invention relates to a spread spectrum pulse position modulation receiver which receives the high-frequency modulated signal from the spread spectrum pulse position modulation transmitter of FIG. 2 to regenerate the first data symbol having the M state and the second data symbol having the N state. FIG. 9 is a block diagram showing a structure of a spread spectrum pulse position modulation receiver according to this further embodiment of the present invention.

According to this further embodiment, there is provided a spread spectrum pulse position modulation receiver, which receives the high-frequency modulated signal from the spread spectrum pulse position modulation transmitter of the FIG. 2 to convert the high-frequency modulated signal into a spread spectrum pulse position modulating signal of a quasi-base band so that the first data symbol having the M state and the second data symbol having the N state are regenerated. The device of FIG. 9 includes an antenna 901 for receiving the high-frequency modulated signal output from the spread spectrum pulse position modulation transmitter of FIG. 2.

A frequency conversion and amplification section 900 converts the high-frequency modulated signal into an intermediate-frequency signal. An oscillator 908, multipliers 910, 911, and 90-degree phase shifter 909 are also provided. The oscillation frequency of the oscillator 908 is approximately equal to a center frequency of the intermediate-frequency signal, which multiplies the intermediate-frequency signal by an output signal of the oscillator 908 for generation of a quasi-base band signal in I-phase to be output, and by a signal 90° phase-shifted from the output signal of the oscillator 908 for generation of a quasi-base band signal in Q-phase to be output.

A first digital matched filter 919 receives the quasi-base band signal in I-phase to output a matched pulse in response to an input of the first spread spectrum pulse position modulating signal and a matched pulse in response to an input of the second spread spectrum pulse position modulating signal that is the inverted version of the first spread spectrum pulse position modulating signal, so that pulse position modulating signals are regenerated. A second digital matched filter 920 receives the quasi-base band signal in Q-phase to output a matched pulse in response to an input of the first spread spectrum pulse position modulating signal and a matched pulse in response to an input of the second spread spectrum pulse position modulating signal that is the inverted version of the first spread spectrum pulse position modulating signal, so that pulse position modulating signals are regenerated.

An amplitude calculation circuit 921 receives the matched pulses from the first and second matched filters 919 and 920 to measure an amplitude of the matched pulses so that the respective pulse position modulating signals are regenerated independently of the carrier phase. A peak detection circuit 922 detects a peak of each pulse position modulating signal and converts such into a digital pulse position modulating signal. A phase detection circuit 923 receives the matched pulses from the first and second matched filters to detect each phase of the matched pulses.

A first matching decision device 927, an AND gate 929, and a D-flip flop 931 are provided in conjunction with a first register 925 for storing the phase of a last positive pulse, which compares the phase detected by the phase detection circuit 923 with the phase of the positive pulse stored in the first register 925, and which when the phase detected by the phase detection circuit 923 substantially matches with the phase of the positive pulse stored in the first register 925, which stores the phase detected by the phase detection circuit 923 in the first register 925, selects a peak detecting signal corresponding to the peak of the positive pulse output from the peak detection circuit 922 for use as an output thereof. A second matching decision device 928, an AND gate 930, and a D-flip flop 932 are provided in conjunction with a second register 926 for storing the phase of a last negative pulse, which compares the phase detected by the phase detection circuit 923 with the phase of the negative pulse stored in the second register 926, and which when the phase detected by the phase detection circuit 923 substantially matches with the phase of the negative pulse stored in the second register 926, which stores the phase detected by the phase detection circuit 923 in the second register 926, selects a peak detecting signal corresponding to the peak of the negative pulse output from the peak detection circuit 922 for use as an output thereof.

A first pulse-interval measurement circuit 933 receives the positive peak detecting signal to measure a pulse interval of the positive peak detecting signal so that a first digital count signal is output. A second pulse-interval measurement circuit 934 receives the negative peak detecting signal to measure a pulse interval of the negative peak detecting signal so that a second digital count signal is output. A first data symbol regeneration circuit 935 regenerates the first data symbol having the M state from the first digital count signal. A second data symbol regeneration circuit 936 regenerates the second data symbol having the N state from the second digital count signal.

In a case in which the first data symbol having the M state and the second data symbol having the N state, demodulated by the spread spectrum pulse position modulation receiver of FIG. 9, are to be serially output, the spread spectrum pulse position modulation receiver of FIG. 9 can further include a parallel/serial conversion section 937 for converting the first data symbol having the M state and the second data symbol having the N state into serial data having a fixed number of bits to be output.

The spread spectrum pulse position modulation receiver of the further embodiment of FIG. 9 receives a signal from the spread spectrum pulse position modulation transmitter of FIG. 2. Then, the receiver converts the received signal into a quasi-base band containing an offset carrier in accordance with an output of a local oscillator 908, the oscillation frequency of which is close to that of the carrier. This is different from the spread spectrum pulse position modulation receiver of FIG. 5 in which the received signal is converted into a perfect or well-regulated base band signal. In the further embodiment of FIG. 9, a bipolar type spread spectrum pulse position modulating signal demodulation section 912 prevents the offset effect.

A structure and operation of the spread spectrum pulse position modulation receiver of FIG. 9 will now be described in further detail with respect to the following sections, frequency conversion and amplification section 900, bipolar type spread spectrum pulse position modulating signal demodulation section 912, and parallel/serial conversion section 937.

In the frequency conversion and amplification section 900, the antenna 901 receives a high-frequency modulated signal transmitted by radio from a spread spectrum pulse position modulation transmitter, e.g., of FIG. 2. The received signal is filtered by a filter 902 and is then amplified by an amplifier 903. Then, a frequency conversion section including a local oscillator 904 and a mixer 905 converts the output signal from the amplifier 903 into an intermediate frequency signal. The intermediate-frequency signal passes through a filter 906 and a gain control amplifier (AGC amplifier) 907 and is amplified to be a constant-level signal.

Then, an oscillator 908, the oscillation frequency of which is substantially equal to the center frequency of the intermediate-frequency signal outputs signals directly to a multiplier 910 and to a multiplier 911 through a 90-degree phase shifter 909. The multiplier 910 multiplies the intermediate-frequency signal by the output of the oscillator 908, while the multiplier 911 multiplies the intermediate-frequency signal by a signal 90° phase shifted from the output of the oscillator 908 through the 90-degree phase shifter 909. Thus, a quadrature detection is performed and a quasi-base band signal in I-phase and a quasi-base band in Q-phase are generated.

The quasi-base band signal in I-phase and the quasi-base band signal in Q-phase are input to the bipolar type spread spectrum pulse position modulating (SS-PPM) signal demodulation section 912. The quasi-base band signals are initially filtered by respective lowpass filters (LPF) 913 and 914, and are then amplified by amplifiers 915 and 916, respectively, according to need.

Then, the quasi-base band signal in I-phase and the quasi-base band signal in Q-phase are converted into digital signals, respectively, by respective A/D converters 917, 918, and input to the first and second matched filters 919, 920, both of which are matched with the same pseudo noise code as that in the transmitter (e.g., 1, 1, 1, −1, −1, 1, −1). Thus, the pulse position modulating signals are regenerated.

Both outputs of the matched filters 919, 920 are input to the amplitude calculation circuit 921 for calculating the amplitude of matched pulses, so that the pulse position modulating signals are regenerated independently of the offset carrier. Then, the peak detection circuit 922 outputs each peak detecting signal of the pulse position modulating signals so that peak-digitized pulse position modulating signals are regenerated.

Both outputs of the matched filters 919, 920 are also input to the phase detection circuit 923 for detecting each phase of the pulses. The output of the phase detection circuit 923 is input to the positive pulse register 925 in which the phase of a last positive pulse is stored, and to the negative pulse register 926 in which the phase of a last negative pulse is stored. Then, the equivalent comparator circuits 927, 928 compare the output of the phase detection circuit 923 with the outputs of the positive pulse register 925 and the negative pulse register 926, respectively.

When the equivalent comparator 927 determines that the phase of the pulse detected by the phase detection circuit 923 substantially matches with the phase of the last positive pulse, the value detected by the phase detection circuit 923 is set in the positive pulse register 925 as a new value, and one pulse of a positive peak detecting signal is sent to the first pulse-interval measurement circuit 933 through the AND gate 929 and the D-flip flop 931 by using the peak detecting signal from the peak detection circuit 922. On the other hand, when the equivalent comparator device 928 determines that the phase of the pulse detected by the phase detection circuit 923 substantially matches with the phase of the last negative pulse, the value detected by the phase detection circuit 923 is set in the negative pulse register 926 as a new value, and one pulse of a negative peak detecting signal is sent to the second pulse-interval measurement circuit 934 through the AND gate 930 and the D-flip flop 932 by using the peak detecting signal from the peak detection circuit 922.

The first pulse-interval measurement circuit 933 measures a separation or interval between an adjacent two pulses corresponding to the positive peaks in response to the positive peak detecting signal to output a digital count signal M", while the second pulse-interval measurement circuit 934 measures a separation or interval between an adjacent two pulses corresponding to the negative peaks in response to the negative peak detecting signal to output a digital count signal N".

The first data symbol regeneration circuit 935 regenerates the original first data symbol having the M state in response to an input of the digital count signal M", while the second data symbol regeneration circuit 936 regenerates the original second data symbol having the N state in response to an input of the digital count signal N".

The parallel/serial conversion section 937 includes a parallel/serial converter 938 for converting the demodulated data symbols having the M and N states, respectively, into serial data having a fixed number of bits.

The amplitude calculation circuit 921 and the phase detection circuit 923 will now be described without description of the matched filters 919, 920, the pulse-interval measurement circuits 933, 934, and the data symbol regeneration circuits 935, 936, because these circuit structures are the same as those described in the embodiment of FIG. 5.

Figure 10:
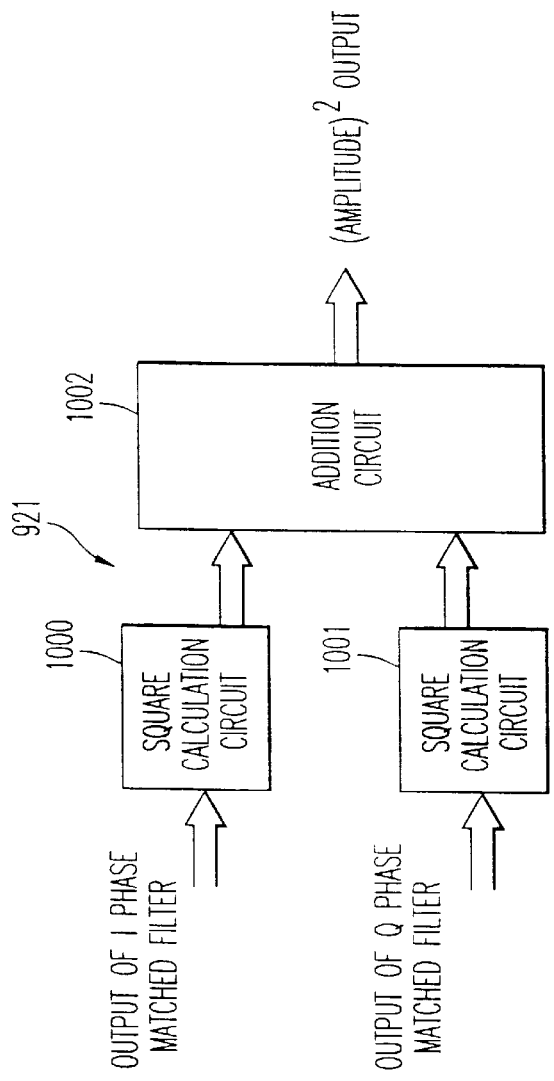
FIG. 10 is a block diagram showing an exemplary circuit structure of an amplitude calculation circuit used in a spread spectrum pulse position modulation receiver according to an embodiment of the present invention.

FIG. 10 is a block diagram showing an exemplary circuit structure of the amplitude calculation circuit 921. In the amplitude calculation circuit 921 of FIG. 10, square calculation circuits 1000, 1001 multiply matched pulses input from the two matched filters 919, 920 by themselves, and an addition circuit 1002 adds both the squared matched pulses together so that a square of the amplitude of the matched pulse is obtained. Then, the peak detection circuit 922 uses the output of the amplitude calculation circuit 921 for peak detection, and this allows peak detection independent of the phase rotation caused by the offset carrier.

Figure 11:
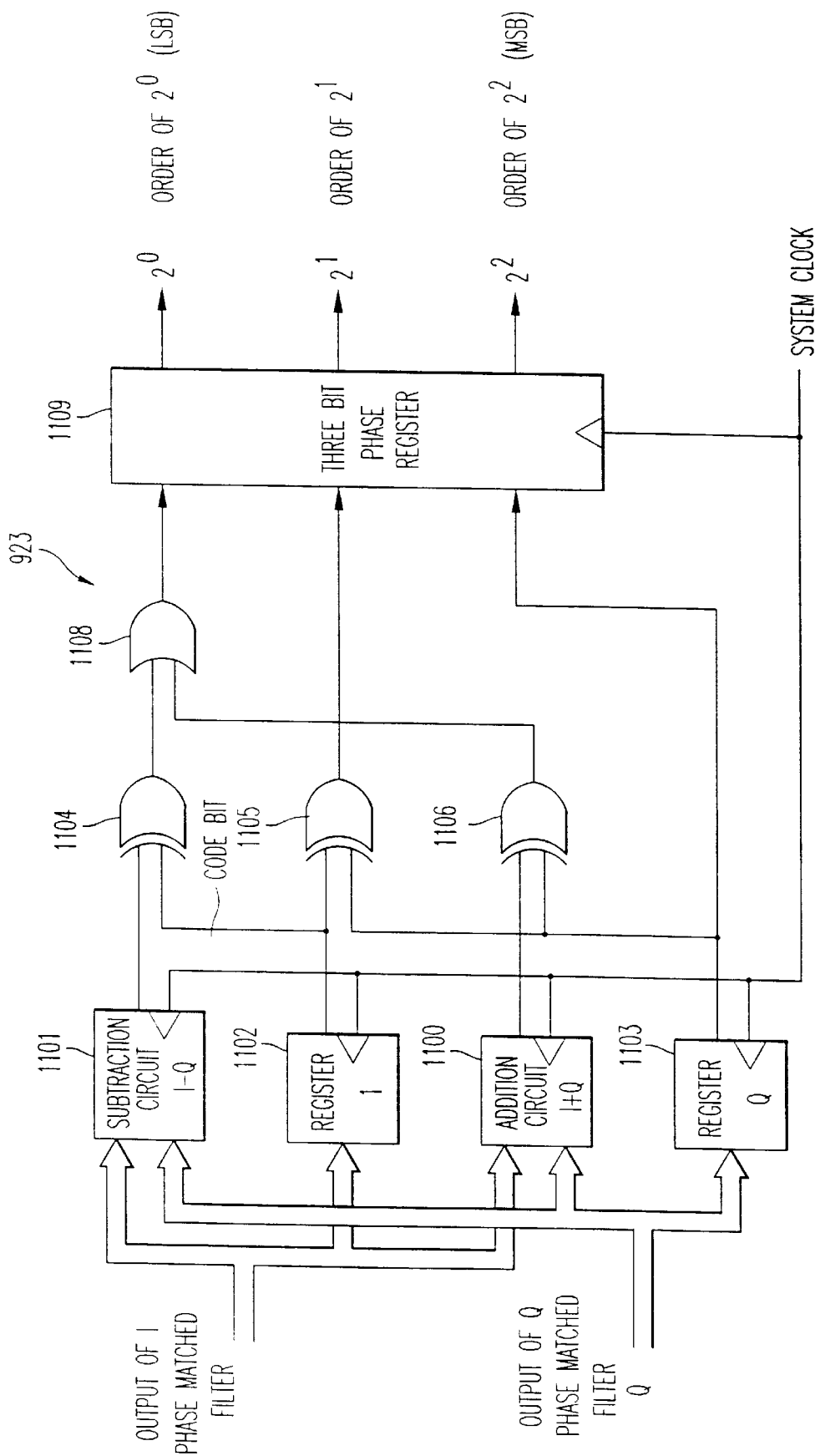
FIG. 11 is a block diagram showing an exemplary circuit structure of a phase detection circuit used in a spread spectrum pulse position modulation receiver according to an embodiment of the present invention.

FIG. 11 is a block diagram showing an exemplary circuit structure of the phase detection circuit 923. In the phase detection circuit 923 of FIG. 11, the output of the I-phase matched filter 919 (the output value is set to I) is input to an addition circuit 1100, a subtraction circuit 1101 and a register 1102, while the output of the Q-phase matched filter 920 (the output value is set to Q) is input to the addition circuit 1100, the subtraction circuit 1101 and a register 1103. The addition circuit 1100 calculates I+Q and the subtraction circuit 1101 calculates I−Q.

Figure 12:
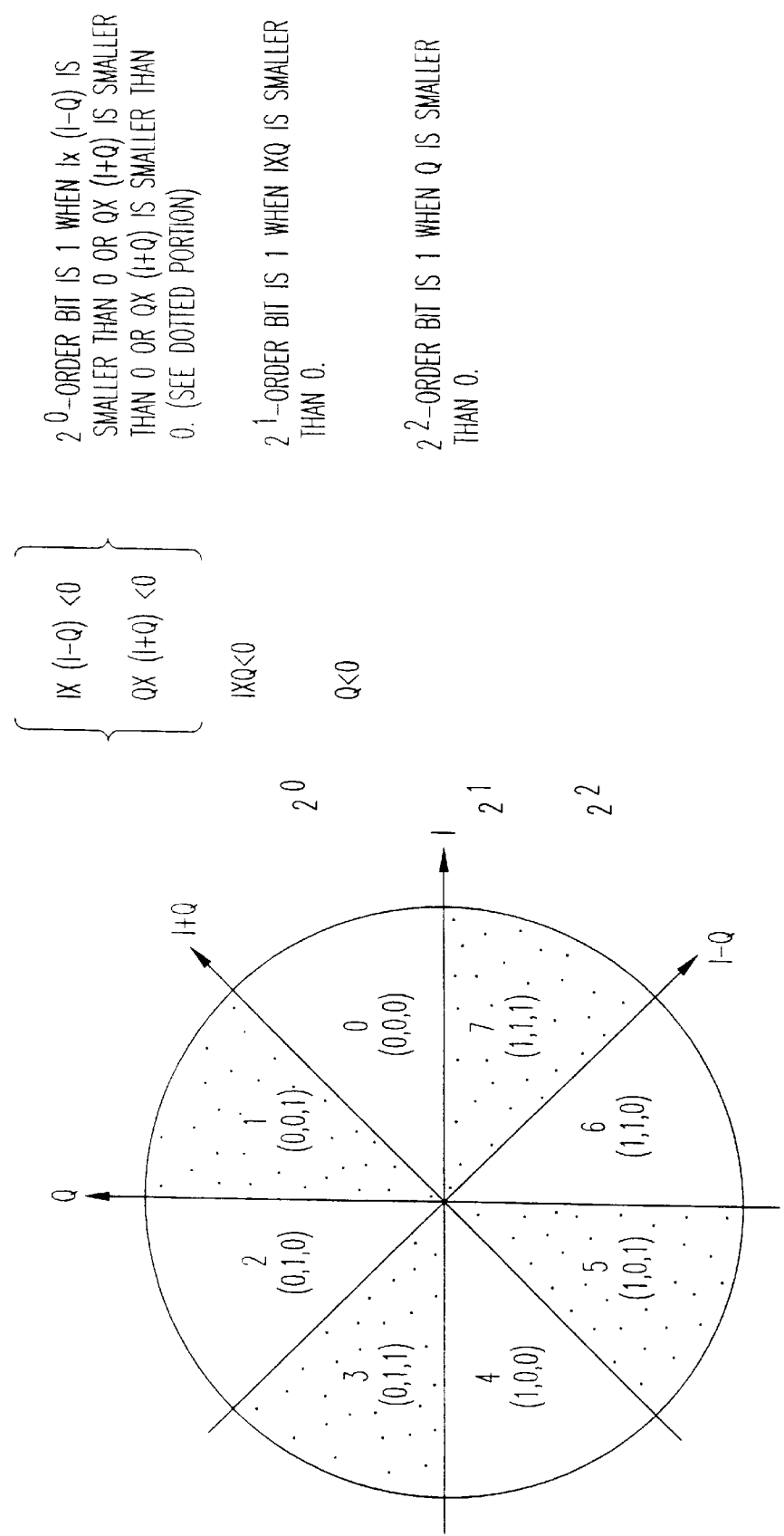
FIG. 12 is a diagram explaining how to detect phases in a phase detection circuit used in a spread spectrum pulse position modulation receiver according to an embodiment of the present invention.
Figure 13:
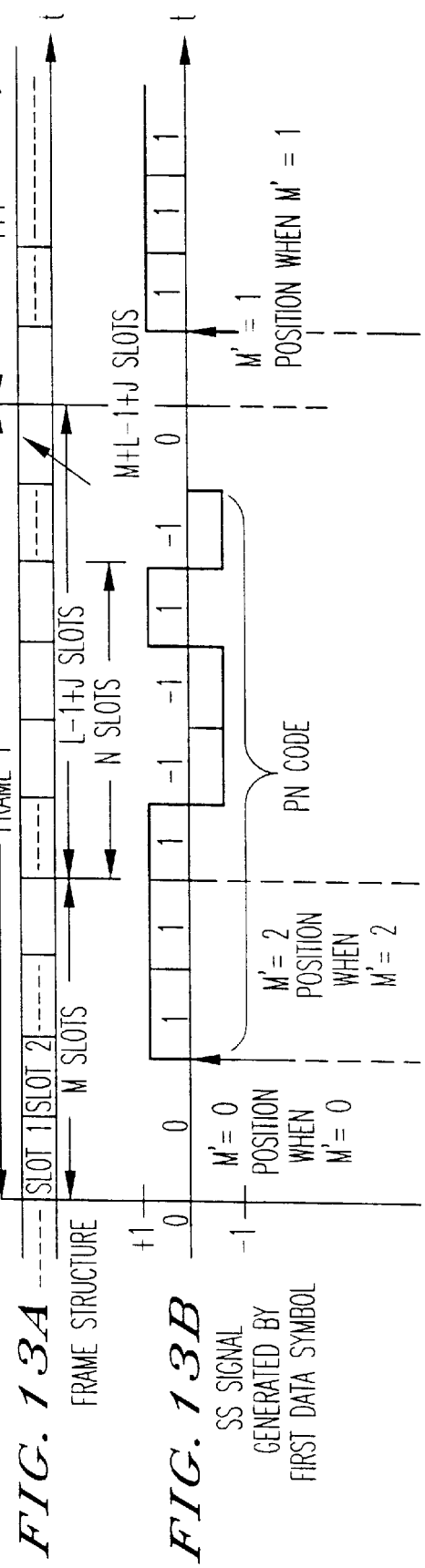
FIGS. 13A–13B are a diagram explaining a background communication method employing a spread spectrum pulse position modulation.
Figure 14:
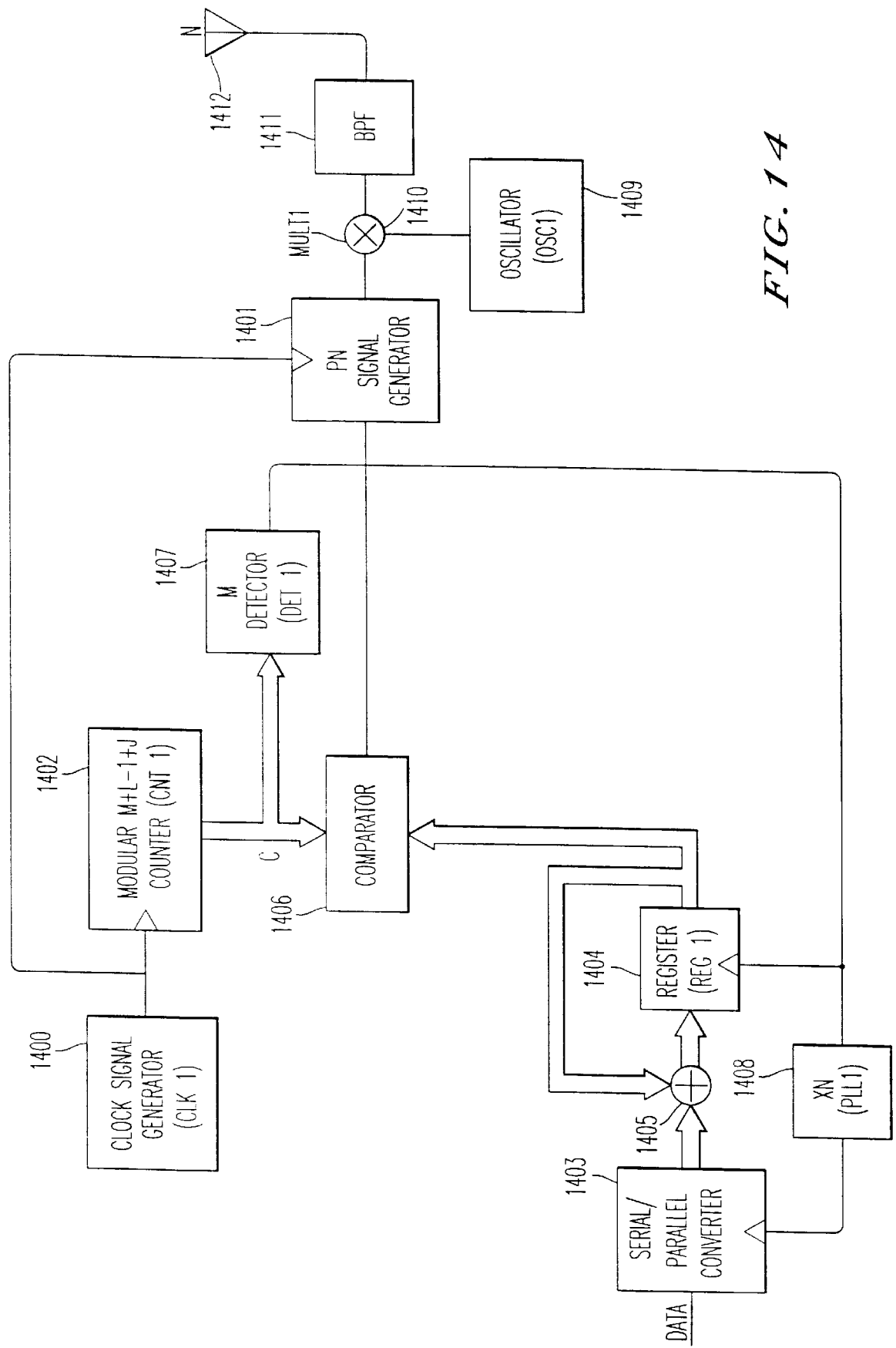
FIG. 14 is a block diagram showing a structure of a transmission unit used in a background spread spectrum pulse position modulation communication system.
Figure 15:
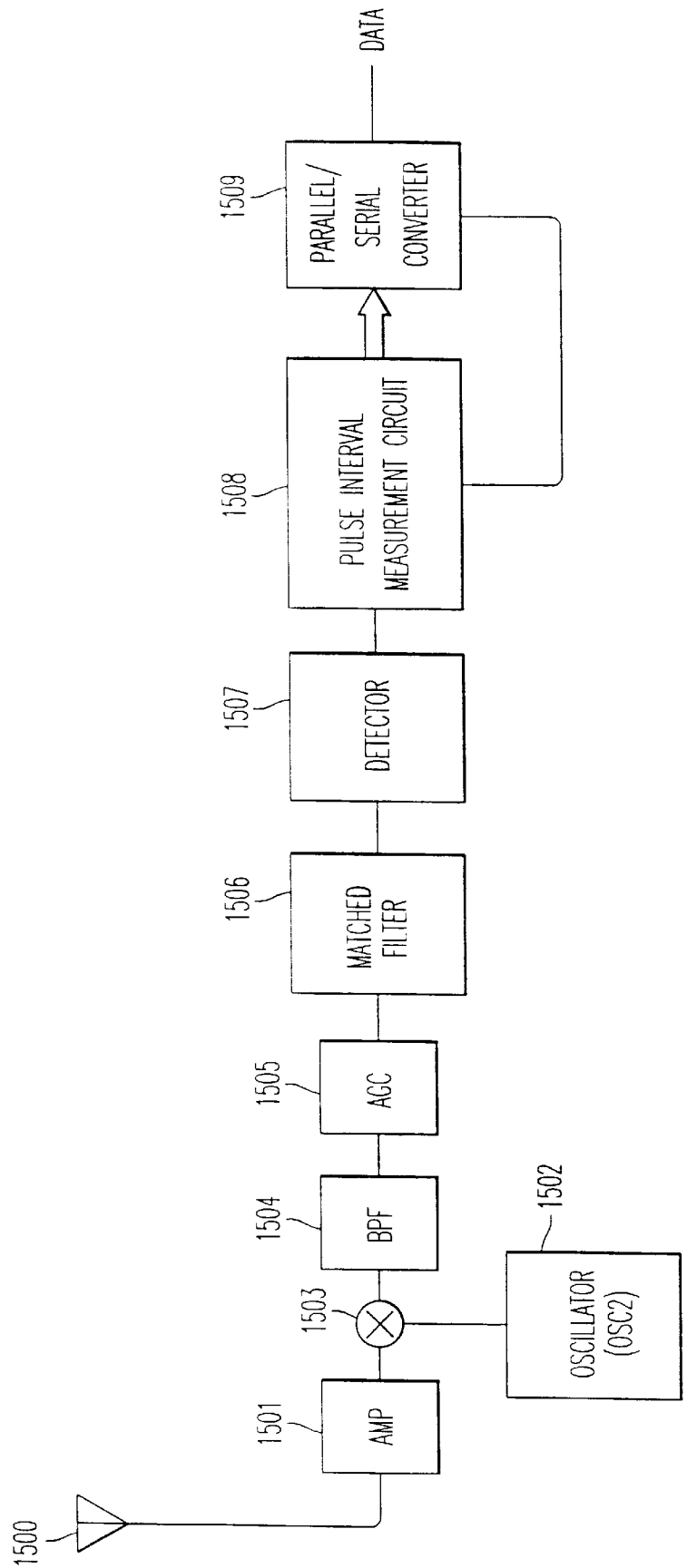
FIG. 15 is a block diagram showing a structure of a reception unit used in a background spread spectrum pulse position modulation communication system.

Then, each matched pulse is determined from plus and minus signs of four values of I, Q, I+Q, and I−Q, as to which area numbered 0 to 7 in FIG. 12 the matched pulse belongs, and the corresponding area number is output as the phase value. In the phase detection circuit 923 of FIG. 11, three bits are assigned to the phase value. Referring to FIG. 12, the most significant bit (MSB) is set to 1 when Q is negative, the intermediate bit is set to 1 when I and Q are different in sign from each other, and the least significant bit (LSB) is set to 1 when I and I−Q or Q and I+Q are different in sign from each other. Gate circuits for outputting such a phase value are shown in FIG. 11. That is, a gate circuit structure for the phase detection circuit 923 is made up of XOR gates 1104–1106, an OR gate 1108, and a three-bit phase register 1109.

As described above, according to the spread spectrum pulse position modulation receiver of the further embodiment of FIG. 9, the base band signal does not need to be regulated as much when converting the high-frequency radio signal into the base band signal, and an offset carrier is allowed, so that a synchronous regeneration part for regenerating the carrier synchronously can be eliminated, and so that the arrangement of the frequency converter part can be simplified, thereby reducing a cost of the receiver. Further, the spread spectrum pulse position modulation receiver can be applied to a case in which technical problems are caused in generating the carrier of the radio signal because of a bad propagation environment.

Obviously, numerous additional modifications and variations of the present invention are possible in light of the above teachings. It is therefore to be understood that within the scope of the appended claims, the present invention may be practiced otherwise than as specifically described herein.

The present application is based on Japanese Priority Document 8-151,917, which is incorporated herein by reference.

What is claimed as new and is desired to be secured by Letters Patent of the United States is:

1. A spread spectrum pulse position modulation/demodulation system receiving an input signal including frames, comprising:
   a first pulse position modulator modulating each frame by inserting a first pseudo noise code into a selected slot of each frame according to the input signal to generate a first spread spectrum pulse position modulating signal;
   a second pulse position modulator modulating each frame by inserting a second pseudo noise code into a selected slot of each frame according to the input signal to generate a second spread spectrum pulse position modulating signal, wherein the second pseudo noise code is an inversion of the first pseudo noise code;
   an adder adding together the first and second spread spectrum pulse position modulating signals to generate a third spectrum pulse position modulating signal as a base band signal;
   a demodulator receiving the third spread spectrum pulse position modulating signal and demodulating the third spread spectrum pulse position modulating signal, the demodulator including only one matched filter to output a first pulse signal corresponding to the first spread spectrum pulse position modulating signal and to output a second pulse signal corresponding to the second spread spectrum pulse position modulating signal.

2. The spread spectrum pulse position modulation/demodulation system according to claim 1, further comprising respective first and second differential coders differential-coding the input signal input to the respective first and second pulse position modulators.

3. The spread spectrum pulse position modulation/demodulation system according to claim 1, further comprising a radio transmitter transmitting the third spread spectrum pulse position modulating signal, and a radio receiver receiving the transmitted third spread spectrum pulse position modulating signal to be supplied to the demodulator.

4. The spread spectrum pulse position modulation/demodulation system according to claim 1, wherein the pseudo noise code is a Baker series.

5. The spread spectrum pulse position modulation/demodulation system according to claim 1, wherein the first pulse signal output of the only one matched filter is a positive pulse signal and the second pulse signal output of the only one matched filter is a negative pulse signal.

6. The spread spectrum pulse position modulation/demodulation system according to claim 1, wherein the only one matched filter is a digital matched filter.

7. The spread spectrum pulse position modulation/demodulation system according to claim 1, wherein the demodulator generates a quasi-base band signal in I-phase and a 90° phase-shifted quasi-base band signal in Q-phase to the only one matched filter.

8. A spread spectrum pulse position modulation/demodulation system receiving an input signal including frames, comprising:
   a first pulse position modulator means for modulating each frame by inserting a first pseudo noise code into a selected slot of each frame according to the input signal to generate a first spread spectrum pulse position modulating signal;
   a second pulse position modulator means for modulating each frame by inserting a second pseudo noise code into a selected slot of each flame according to the input signal to generate a second spread spectrum pulse position modulating signal, wherein the second pseudo noise code is an inversion of the first pseudo noise code;
   an adding means for adding together the first and second spread spectrum pulse position modulating signals to generate a third spread spectrum pulse position modulating signal as a base band signal;
   a demodulator means for receiving the third spread spectrum pulse position modulating signal and for demodulating the third spread spectrum pulse position modulating signal, the demodulator means including only one matched filter means to output a first pulse signal corresponding to the first spread spectrum pulse position modulating signal and to output a second pulse signal corresponding to the second spread spectrum pulse position modulating signal.

9. The spread spectrum pulse position modulation/demodulation system according to claim 8, further comprising respective first and second differential coding means for differential-coding the input signal input to the respective first and second pulse position modulator means.

10. The spread spectrum pulse position modulation/demodulation system according to claim 8, further comprising a transmitter means for transmitting the third spread spectrum pulse position modulating signal, and a receiver means for receiving the transmitted third spread spectrum pulse position modulating signal to be supplied to the demodulator means.

11. The spread spectrum pulse position modulation/demodulation system according to claim 8, wherein the pseudo noise code is a Baker series.

12. The spread spectrum pulse position modulation/demodulation system according to claim 8, wherein the first pulse signal output of the only one matched filter means is a positive pulse signal and the second pulse signal output of the only one matched filter means is a negative pulse signal.

13. The spread spectrum pulse position modulation/demodulation system according to claim 8, wherein the only one matched filter means is a digital matched filter.

14. The spread spectrum pulse position modulation/demodulation system according to claim 8, wherein the demodulator means generates a quasi-base band signal in I-phase and a 90° phase-shifted quasi-base band signal in Q-phase to the only one matched filter means.

15. A spread spectrum pulse position modulation/demodulation method for an input signal including frames, comprising the steps of:
    first modulating each frame by inserting a first pseudo noise code into a selected slot of each frame according to the input signal to generate a first spread spectrum pulse position modulating signal;
    second modulating each frame by inserting a second pseudo noise code into a selected slot of each frame according to the input signal to generate a second spread spectrum pulse position modulating signal, wherein the second pseudo noise code is an inversion of the first pseudo noise code;
    adding together the first and second spread spectrum pulse position modulating signals to generate a third spectrum pulse position modulating signal as a base band signal;
    demodulating the third spread spectrum pulse position modulating signal by match filtering through only one matched filter to output a first pulse signal corresponding to the first spread spectrum pulse position modulating signal and to output a second pulse signal corresponding to the second spread spectrum pulse position modulating signal.

16. The spread spectrum pulse position modulation/demodulation method according to claim 15, further comprising the step of first and second differential-coding the input signal prior to the first and second modulating steps.

17. The spread spectrum pulse position modulation/demodulation method according to claim 15, further comprising the steps of radio transmitting the third spread spectrum pulse position modulating signal, and radio receiving the transmitted third spread spectrum pulse position modulating signal.

18. The spread spectrum pulse position modulation/demodulation method according to claim 15, wherein in the first and second modulating steps the pseudo noise code is a Baker series.

19. The spread spectrum pulse position modulation/demodulation method according to claim 15, wherein in the match filtering step through the only one matched filter the first pulse signal is a positive pulse signal and the second pulse signal is a negative pulse signal.

20. The spread spectrum pulse position modulation/demodulation method according to claim 15, wherein in the match filtering step the only one matched filters is a digital match filter.

21. The spread spectrum pulse position modulation/demodulation method according to claim 15, wherein the demodulating step includes the substeps of generating a quasi-base band signal in I-phase and generating a 90° phase-shifted quasi-base band signal in Q-phase.

22. A spread spectrum pulse position modulation/demodulation system receiving an input signal including frames, comprising:
    a first pulse position modulator modulating each frame by inserting a first pseudo noise code into a selected slot of each frame according to the input signal to generate a first spread spectrum pulse position modulating signal;
    a second pulse position modulator modulating each frame by inserting a second pseudo noise code into a selected slot of each frame according to the input signal to generate a second spread spectrum pulse position modulating signal, wherein the second pseudo noise code is an inversion of the first pseudo noise code;
    an adder adding together the first and second spread spectrum pulse position modulating signals to generate a third spectrum pulse position modulating signal;
    a demodulator receiving the third spread spectrum pulse position modulating signal and demodulating the third spread spectrum pulse position modulating signal, the demodulator including pulse interval measurement circuits to measure respective intervals between pulses in the first and second spread spectrum pulse position modulating signals to output a first pulse signal corresponding to the first spread spectrum pulse position modulating signal and to output a second pulse signal corresponding to the second spread spectrum pulse position modulating signal.

23. The spread spectrum pulse position modulation/demodulation system according to claim 22, further comprising respective first and second differential coders differential-coding the input signal input to the respective first and second pulse position modulators.

24. The spread spectrum pulse position modulation/demodulation system according to claim 22, further comprising a radio transmitter transmitting the third spread spectrum pulse position modulating signal, and a radio receiver receiving the transmitted third spread spectrum pulse position modulating signal to be supplied to the demodulator.

25. The spread spectrum pulse position modulation/demodulation system according to claim 22, wherein the pseudo noise code is a Baker series.

26. The spread spectrum pulse position modulation/demodulation system according to claim 22, wherein the first pulse signal output of the pulse interval measurement circuits is a positive pulse signal and the second pulse signal output of the pulse interval measurement circuits is a negative pulse signal.

27. The spread spectrum pulse position modulation/demodulation system according to claim 22, wherein the pulse interval measurement circuits include a digital matched filter.

28. The spread spectrum pulse position modulation/demodulation system according to claim 22, wherein the demodulator generates a quasi-base band signal in I-phase and a 90° phase-shifted quasi-base band signal in Q-phase to two pulse interval measurement circuits.

29. A spread spectrum pulse position modulation/demodulation system receiving an input signal including frames, comprising:
    a first pulse position modulator means for modulating each frame by inserting a first pseudo noise code into a selected slot of each frame according to the input signal to generate a first spread spectrum pulse position modulating signal;

a second pulse position modulator means for modulating each frame by inserting a second pseudo noise code into a selected slot of each frame according to the input signal to generate a second spread spectrum pulse position modulating signal, wherein the second pseudo noise code is an inversion of the first pseudo noise code;

an adding means for adding together the first and second spread spectrum pulse position modulating signals to generate a third spread spectrum pulse position modulating signal;

a demodulator means for receiving the third spectrum pulse position modulating signal and for demodulating the third spread spectrum pulse position modulating signal, the demodulator means including pulse interval measurement means to measure respective intervals between pulses in the first and second spread spectrum pulse position modulating signals means to output a first pulse signal corresponding to the first spread spectrum pulse position modulating signal and to output a second pulse signal corresponding to the second spread spectrum pulse position modulating signal.

30. The spread spectrum pulse position modulation/demodulation system according to claim 29, further comprising respective first and second differential coding means for differential-coding the input signal input to the respective first and second pulse position modulator means.

31. The spread spectrum pulse position modulation/demodulation system according to claim 29, further comprising a transmitter means for transmitting the third spread spectrum pulse position modulating signal, and a receiver means for receiving the transmitted third spread spectrum pulse position modulating signal to be supplied to the demodulator means.

32. The spread spectrum pulse position modulation/demodulation system according to claim 29, wherein the pseudo noise code is a Baker series.

33. The spread spectrum pulse position modulation/demodulation system according to claim 29, wherein the first pulse signal output of the pulse interval measurement means is a positive pulse signal and the second pulse signal output of the pulse interval measurement means is a negative pulse signal.

34. The spread spectrum pulse position modulation/demodulation system according to claim 29, wherein the pulse interval measurement means includes a digital matched filter.

35. The spread spectrum pulse position modulation/demodulation system according to claim 29, wherein the demodulator means generates a quasi-base band signal in I-phase and a 90° phase-shifted quasi-base band signal in Q-phase to two pulse interval measurement means.

36. A spread spectrum pulse position modulation/demodulation method for an input signal including frames, comprising the steps of:

first modulating each frame by inserting a first pseudo noise code into a selected slot of each frame according to the input signal to generate a first spread spectrum pulse position modulating signal;

second modulating each frame by inserting a second pseudo noise code into a selected slot of each frame according to the input signal to generate a second spread spectrum pulse position modulating signal, wherein the second pseudo noise code is an inversion of the first pseudo noise code;

adding together the first and second spread spectrum pulse position modulating signals to generate a third spectrum pulse position modulating signal;

demodulating the third spread spectrum pulse position modulating signal by measuring respective intervals between pulses in the first and second spread spectrum pulse position modulating signals to output a first pulse signal corresponding to the first spread spectrum pulse position modulating signal and to output a second pulse signal corresponding to the second spread spectrum pulse position modulating signal.

37. The spread spectrum pulse position modulation/demodulation method according to claim 36, further comprising the step of first and second differential-coding the input signal prior to the first and second modulating steps.

38. The spread spectrum pulse position modulation/demodulation method according to claim 36, further comprising the steps of radio transmitting the third spread spectrum pulse position modulating signal, and radio receiving the transmitted third spread spectrum pulse position modulating signal.

39. The spread spectrum pulse position modulation/demodulation method according to claim 36, wherein in the first and second modulating steps the pseudo noise code is a Baker series.

40. The spread spectrum pulse position modulation/demodulation method according to claim 36, wherein in the demodulating step the first pulse signal includes a positive pulse signal and the second pulse signal includes a negative pulse signal.

41. The spread spectrum pulse position modulation/demodulation method according to claim 36, wherein the demodulating step includes a digital match filtering.

42. The spread spectrum pulse position modulation/demodulation method according to claim 36, wherein the demodulating step includes the substeps of generating a quasi-base band signal in I-phase and generating a 90° phase-shifted quasi-base band signal in Q-phase.

43. A spread spectrum pulse position modulation system receiving an input signal including frames, comprising:

a first pulse position modulator modulating each fame by inserting a first pseudo noise code into a selected slot of each frame according to the input signal to generate a first spread spectrum pulse position modulating signal;

a second pulse position modulator modulating each frame by inserting a second pseudo noise code into a selected slot of each frame according to the input signal to generate a second spread spectrum pulse position modulating signal, wherein the second pseudo noise code is an inversion of the first pseudo noise code;

an adder adding together the first and second spread spectrum pulse position modulating signals to generate a third spectrum pulse position modulating signal.

44. The spread spectrum pulse position modulation system according to claim 43, further comprising respective first and second differential coders differential-coding the input signal input to the respective first and second pulse position modulators.

45. The spread spectrum pulse position modulation system according to claim 43, further comprising a radio transmitter transmitting the third spread spectrum pulse position modulating signal.

46. The spread spectrum pulse position modulation system according to claim 43, wherein the pseudo noise code is a Baker series.

47. A spread spectrum pulse position modulation system receiving an input signal including frames, comprising:
- a first pulse position modulator means for modulating each frame by inserting a first pseudo noise code into a selected slot of each frame according to the input signal to generate a first spread spectrum pulse position modulating signal;
- a second pulse position modulator means for modulating each frame by inserting a second pseudo noise code into a selected slot of each frame according to the input signal to generate a second spread spectrum pulse position modulating signal, wherein the second pseudo noise code is an inversion of the first pseudo noise code;
- an adding means for adding together the first and second spread spectrum pulse position modulating signals to generate a third spread spectrum pulse position modulating signal.

48. The spread spectrum pulse position modulation system according to claim 47, further comprising respective first and second differential coding means for differential-coding the input signal input to the respective first and second pulse position modulator means.

49. The spread spectrum pulse position modulation system according to claim 47, further comprising a transmitter means for transmitting the third spread spectrum pulse position modulating signal.

50. The spread spectrum pulse position modulation system according to claim 47, wherein the pseudo noise code is a Baker series.

51. A spread spectrum pulse position modulation method for an input signal including frames, comprising the steps of:
- first modulating each frame by inserting a first pseudo noise code into a selected slot of each frame according to the input signal to generate a first spread spectrum pulse position modulating signal;
- second modulating each frame by inserting a second pseudo noise code into a selected slot of each frame according to the input signal to generate a second spread spectrum pulse position modulating signal, wherein the second pseudo noise code is an inversion of the first pseudo noise code;
- adding together the first and second spread spectrum pulse position modulating signals to generate a third spectrum pulse position modulating signal.

52. The spread spectrum pulse position modulation method according to claim 51, further comprising the step of first and second differential-coding the input signal prior to the first and second modulating steps.

53. The spread spectrum pulse position modulation method according to claim 51, further comprising the step of radio transmitting the third spread spectrum pulse position modulating signal.

54. The spread spectrum pulse position modulation method according to claim 51, wherein in the first and second modulating steps the pseudo noise code is a Baker series.

55. A spread spectrum pulse position demodulation system for receiving and demodulating a signal from a modulator for modulating an input signal including frames including a first pulse position modulator modulating each frame by inserting a first pseudo noise code into a selected slot of each frame according to the input signal to generate a first spread spectrum pulse position modulating signal, a second pulse position modulator modulating each frame by inserting a second pseudo noise code into a selected slot of each frame according to the input signal to generate a second spread spectrum pulse position modulating signal, wherein the second pseudo noise code is an inversion of the first pseudo noise code, and an adder adding together the first and second spread spectrum pulse position modulating signals to generate a third spectrum pulse position modulating signal, the demodulation system comprising:
- a demodulator receiving the third spread spectrum pulse position modulating signal and demodulating the third spread spectrum pulse position modulating signal, the demodulator including at least one matched filter to output a first pulse signal corresponding to the first spread spectrum pulse position modulating signal and to output a second pulse signal corresponding to the second spread spectrum pulse position modulating signal.

56. The spread spectrum pulse position demodulation system according to claim 55, wherein the pseudo noise code is a Baker series.

57. The spread spectrum pulse position demodulation system according to claim 55, wherein the first pulse signal output of the at least one matched filter is a positive pulse signal and the second pulse signal output of the at least one matched filter is a negative pulse signal.

58. The spread spectrum pulse position demodulation system according to claim 55, wherein the at least one matched filter is a digital matched filter.

59. The spread spectrum pulse position demodulation system according to claim 55, wherein the demodulator generates a quasi-base band signal in I-phase and a 90° phase-shifted quasi-base band signal in Q-phase to two matched filters.

60. A spread spectrum pulse position demodulation system for receiving and demodulating a signal from a modulator for modulating an input signal including frames and including a first pulse position modulator means for modulating each frame by inserting a first pseudo noise code into a selected slot of each frame according to the input signal to generate a first spread spectrum pulse position modulating signal, a second pulse position modulator means for modulating each frame by inserting a second pseudo noise code into a selected slot of each frame according to the input signal to generate a second spread spectrum pulse position modulating signal, wherein the second pseudo noise code is an inversion of the first pseudo noise code, and an adding means for adding together the first and second spread spectrum pulse position modulating signals to generate a third spread spectrum pulse position modulating signal, the demodulation system comprising:
- a demodulator means for receiving the third spread spectrum pulse position modulating signal and for demodulating the third spread spectrum pulse position modulating signal, the demodulator means including at least one matched filter means to output a first pulse signal corresponding to the first spread spectrum pulse position modulating signal and to output a second pulse signal corresponding to the second spread spectrum pulse position modulating signal.

61. The spread spectrum pulse position demodulation system according to claim 60, wherein the pseudo noise code is a Baker series.

62. The spread spectrum pulse position demodulation system according to claim 60, wherein the first pulse signal output of the at least one matched filter means is a positive pulse signal and the second pulse signal output of the at least one matched filter means is a negative pulse signal.

63. The spread spectrum pulse position demodulation system according to claim 60, wherein the at least one matched filter means is a digital matched filter.

64. The spread spectrum pulse position demodulation system according to claim 60, wherein the demodulator means generates a quasi-base band signal in I-phase and a 90° phase-shifted quasi-base band signal in Q-phase to two matched filter means.

65. A spread spectrum pulse position demodulation method for receiving and demodulating a modulated signal modulated by a modulating method receiving an input signal and first modulating each frame by inserting a first pseudo noise code into a selected slot of each frame according to the input signal to generate a first spread spectrum pulse position modulating signal, second modulating each frame by inserting a second pseudo noise code into a selected slot of each frame according to the input signal to generate a second spread spectrum pulse position modulating signal, wherein the second pseudo noise code is an inversion of the first pseudo noise code, and adding together the first and second spread spectrum pulse position modulating signals to generate a third spectrum pulse position modulating signal, the demodulating method comprising the step of:

demodulating the third spread spectrum pulse position modulating signal by match filtering to output a first pulse signal corresponding to the first spread spectrum pulse position modulating signal and to output a second pulse signal corresponding to the second spread spectrum pulse position modulating signal.

66. The spread spectrum pulse position demodulation method according to claim 65, wherein in the pseudo noise code is a Baker series.

67. The spread spectrum pulse position demodulation method according to claim 65, wherein in the match filtering step the first pulse signal is a positive pulse signal and the second pulse signal is a negative pulse signal.

68. The spread spectrum pulse position demodulation method according to claim 65, wherein the match filtering step is a digital match filtering.

69. The spread spectrum pulse position demodulation method according to claim 65, wherein the demodulating step includes the substeps of generating a quasi-base band signal in I-phase and generating a 90° phase-shifted quasi-base band signal in Q-phase.

* * * * *

UNITED STATES PATENT AND TRADEMARK OFFICE
CERTIFICATE OF CORRECTION

PATENT NO. : 6,041,074

DATED : March 21, 2000

INVENTOR(S): Masaru NAKAMURA

It is certified that an error appears in the above-identified patent and that said Letters Patent is hereby corrected as shown below:

On the title page, item [75], the Inventor's address is incorrectly listed. It should be:

--[75] Inventor: Masaru Nakamura, Yokohama, Japan--

Signed and Sealed this

Tenth Day of April, 2001

*Attest:*

NICHOLAS P. GODICI

*Attesting Officer*   *Acting Director of the United States Patent and Trademark Office*